US012288127B2

(12) United States Patent
Bravyi et al.

(10) Patent No.: US 12,288,127 B2
(45) Date of Patent: Apr. 29, 2025

(54) EFFICIENT SYNTHESIS OF OPTIMAL MULTI-QUBIT CLIFFORD CIRCUITS

(71) Applicant: International Business Machines Corporation, Armonk, NY (US)

(72) Inventors: Sergey Bravyi, Ossining, NY (US); Joseph Latone, San Francisco, CA (US); Dmitri Maslov, New Canaan, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1154 days.

(21) Appl. No.: 17/066,916

(22) Filed: Oct. 9, 2020

(65) Prior Publication Data

US 2022/0114468 A1    Apr. 14, 2022

(51) Int. Cl.
*G06N 10/00* (2022.01)
*G06F 7/76* (2006.01)
*G06F 17/16* (2006.01)

(52) U.S. Cl.
CPC ............ *G06N 10/00* (2019.01); *G06F 7/76* (2013.01); *G06F 17/16* (2013.01)

(58) Field of Classification Search
CPC ............ G06N 10/00; G06F 7/76; G06F 17/16
See application file for complete search history.

(56) References Cited

U.S. PATENT DOCUMENTS

| 10,242,321 | B2 | 3/2019 | Bocharov et al. |
| 11,474,867 | B2 * | 10/2022 | Bonderson ............. G06N 10/00 |
| 2011/0145288 | A1 * | 6/2011 | Hall ....................... G06N 10/00 |
| | | | 707/E17.014 |

(Continued)

OTHER PUBLICATIONS

Mell et al., "The NIST Definition of Cloud Computing," Recommendations of the National Institute of Standards and Technology, NIST Special Publication 800-145, Sep. 2011, 7 pages.

(Continued)

*Primary Examiner* — Barbara M Level
(74) *Attorney, Agent, or Firm* — Amin, Turocy & Watson, LLP

(57) ABSTRACT

Systems and techniques that facilitate efficient synthesis of optimal multi-qubit Clifford circuits are provided. In various embodiments, a system can receive as input a number n representing a quantity of qubits. In various instances, the system can generate, via a cost-invariant reduction function, as output a library of different n-qubit canonical representatives that respectively correspond to different cost-invariant equivalence classes of n-qubit Clifford group elements. In various embodiments, a system can receive as input a first Clifford group element. In various aspects, the system can search a database of canonical representatives, wherein different canonical representatives in the database respectively correspond to different cost-invariant equivalence classes of Clifford group elements. In various cases, the system can identify based on the search a second Clifford group element that implements the first Clifford group element and that has a lower entangling-gate cost than the first Clifford group element.

15 Claims, 20 Drawing Sheets

(56) References Cited

U.S. PATENT DOCUMENTS

| | | | |
|---|---|---|---|
| 2015/0339417 A1* | 11/2015 | Garcia-Ramirez | G06F 17/16 703/2 |
| 2017/0220948 A1 | 8/2017 | Bocharov et al. | |
| 2018/0039903 A1 | 2/2018 | Mosca et al. | |
| 2018/0276014 A1* | 9/2018 | Kliuchnikov | G06F 9/45508 |
| 2019/0205783 A1 | 7/2019 | Nam et al. | |
| 2020/0134107 A1* | 4/2020 | Low | G06F 30/327 |
| 2020/0184024 A1 | 6/2020 | Nam et al. | |
| 2020/0272926 A1* | 8/2020 | Chaplin | G06F 9/3885 |
| 2021/0011771 A1* | 1/2021 | Bonderson | G06N 5/01 |

OTHER PUBLICATIONS

Zheng et al., "Constant depth fault-tolerant Clifford circuits for multi-qubit large block codes," Quantum Science and Technology 5, arXiv:2003.12328v2 [quant-ph], Aug. 1, 2020, 14 pages.

Proctor et al., "Direct randomized benchmarking for multi-qubit devices," Phys. Rev. Lett. 123, arXiv:1807.07975v3 [quant-ph], Jul. 31, 2019, 13 pages.

De Almeida et al., "CNOT Gate Mappings to Clifford+T Circuits in IBM Architectures," IEEE 49th International Symposium on Multiple-Valued Logic, 2019, 6 pages.

Niemann et al., "Improved Synthesis of Clifford+T Quantum Functionality," Design, Automation & Test in Europe Conference & Exhibition, 2018, 4 pages.

Amy et al., "A Meet-in-the-Middle Algorithm for Fast Synthesis of Depth-Optimal Quantum Circuits," IEEE Transactions on Computer-Aided Design of Integrated Circuits and Systems, vol. 32, Issue 6, Jun. 2013, 13 pages.

Knill et al., "Randomized Benchmarking of Quantum Gates," National Institute of Standards and Technology, Phys. Rev. A 77, 012307, arXiv:0707.0963v1 [quant-ph], Jan. 8, 2008, 13 pages.

Kliuchnikov et al., "Optimization of Clifford Circuits," Phys. Rev. A 88, arXiv:1305.0810v2 [quant-ph], Nov. 10, 2013, 8 pages.

Bravyi et al., "Hadamard-free circuits expose the structure of the Clifford group," Quantum Physics; arXiv:2003.09412v1 [quant-ph], Mar. 23, 2020, 34 pages.

Heyfron et al., "An Efficient Quantum Compiler that Reduces T Count," Quantum Physics; arXiv:1712.01557v3, May 25, 2018, 19 pages.

Rokicki et al., "The diameter of the Rubik's Cube group is twenty," SIAM J. Discrete Math., vol. 27, No. 2, Jun. 19, 2013, 24 pages.

Magesan et al., "Characterizing quantum gates via randomized benchmarking," Phys. Rev. A 85, 042311, arXiv:1109.6887 [quant-ph], Apr. 27, 2012, 19 pages.

Magesan et al., "Robust randomized benchmarking of quantum processes," Physical Review Letters, 106(18):180504, arXiv:1009.3639v1 [quant-ph], Oct. 22, 2018, 5 pages.

Aaronson, "Shadow tomography of quantum states," SIAM Journal on Computing, arXiv:1711.01053 [quant-ph], Nov. 13, 2018, 29 pages.

Huang et al., "Predicting Many Properties of a Quantum System from Very Few Measurements," Nature Physics, arXiv:2002.08953 [quant-ph], Apr. 23, 2020, 40 pages.

Patel et al., "Efficient Synthesis of Linear Reversible Circuits," Quantum Information and Computation, vol. 8, No. 3-4, arXiv:quant-ph/0302002, Feb. 3, 2003, 12 pages.

Aaronson et al., "Improved Simulation of Stabilizer Circuits," Phys. Rev. A 70, 052328, arXiv:quant-ph/0406196v5, Jun. 18, 2008, 15 pages.

Magesan et al., "Scalable and Robust Randomized Benchmarking of Quantum Processes," Physical Review Letters, 106(18):180504, vol. 106, Issue 18, 2011, 4 pages.

Aaronson et al., "Improved Simulation of Stabilizer Circuits," Phys. Rev. A 70, 052328, arXiv:quant-ph/0406196v1, Jun. 25, 2004, 20 pages.

* cited by examiner

```
C_0 ← Reduce(I)
for j = 1 to ∞ do
    C_j ← ∅
    for U ∈ C_{j-1} do
        for V ∈ Gen do
            W ← Reduce(U · V)
            if ((W ∉ C_{j-1}) AND (W ∉ C_{j-2})) then C_j ← C_j ∪ {W}
        end for
    end for
    if (C_j == ∅) then break
end for
```

FIG. 8

6-Qubit Clifford Operator Count Reduction via Cost-Invariant Equivalence Classes (n=6)

| CNOT Cost | Number of Possible Optimal Clifford Operators | Number of Cost-Invariant Equivalence Classes |
|---|---|---|
| 0 | 46,656 | 1 |
| 1 | 6,298,560 | 1 |
| 2 | 554,273,280 | 4 |
| 3 | 39,045,473,280 | 23 |
| 4 | 2,365,081,986,240 | 198 |
| 5 | 126,526,140,927,360 | 2,549 |
| 6 | 5,998,793,185,860,480 | 42,883 |
| 7 | 249,378,588,704,827,008 | 824,723 |
| 8 | 8,870,235,256,471,637,952 | 16,086,167 |
| 9 | 255,646,483,904,239,690,752 | 294,266,642 |
| 10 | 5,278,109,585,506,533,785,088 | 4,399,997,085 |
| 11 | 58,697,087,161,047,579,538,560 | 40,791,942,327 |
| 12 | 135,876,260,385,953,644,020,480 | 92,804,759,960 |
| 13 | 7,998,401,853,543,422,302,848 | 5,666,221,415 |
| 14 | 6,525,042,824,342,016 | 8,281 |
| 15 | 13,308,157,440 | 3 |
| Total | 208,114,637,736,580,743,168,000 | 143,974,152,262 |

FIG. 9

$$U = \begin{bmatrix} \cdots & \cdots & \cdots & \cdots & \cdots & \cdots \\ \cdots & \cdots & \cdots & \cdots & \cdots & \cdots \\ \cdots & \cdots & a_{i,j} \; b_{i,j} & \cdots & \cdots \\ \cdots & \cdots & c_{i,j} \; d_{i,j} & \cdots & \cdots \\ \cdots & \cdots & \cdots & \cdots & \cdots & \cdots \\ \cdots & \cdots & \cdots & \cdots & \cdots & \cdots \end{bmatrix}$$

1102

$$f_1(U) = \begin{bmatrix} \cdots & \cdots & \cdots \\ \cdots & r_{i,j} & \cdots \\ \cdots & \cdots & \cdots \end{bmatrix}$$

$$\text{Reduce}(U) = \arg\min_{W \in S_n'(U)} \min_{L \in Loc'(U,W)} \min_{R \in Loc} LWUW^{-1}R$$

| Computation Time for Pruned Cost-Invariant Reduction Function (Reduce($U$)) ||
|---|---|
| Number of Qubits ($n$) | Computation Time (Seconds) |
| 2 | 6E-07 |
| 3 | 2E-06 |
| 4 | 2E-06 |
| 5 | 2E-06 |
| 6 | 6E-06 |

Number of Cost-Invariant Equivalence Classes for n<=6

| CNOT Cost | Qubits (n) | | | | |
|---|---|---|---|---|---|
| | 2 | 3 | 4 | 5 | 6 |
| 0 | 1 | 1 | 1 | 1 | 1 |
| 1 | 1 | 1 | 1 | 1 | 1 |
| 2 | 1 | 3 | 4 | 4 | 4 |
| 3 | 1 | 8 | 20 | 22 | 23 |
| 4 | | 10 | 112 | 183 | 198 |
| 5 | | 3 | 525 | 1,958 | 2,549 |
| 6 | | 1 | 1,230 | 22,257 | 42,883 |
| 7 | | | 453 | 223,723 | 824,723 |
| 8 | | | 16 | 1,441,124 | 16,086,167 |
| 9 | | | 1 | 2,471,855 | 294,266,642 |
| 10 | | | | 161,458 | 4,399,997,085 |
| 11 | | | | 72 | 40,791,942,327 |
| 12 | | | | 1 | 92,804,759,960 |
| 13 | | | | | 5,666,221,415 |
| 14 | | | | | 8,281 |
| 15 | | | | | 3 |
| Totals | 4 | 27 | 2,363 | 4,322,659 | 143,974,152,262 |

Time and Memory to Generate Library of Canonical Representatives

| Qubits (n) | Time (Seconds) | Memory (Megabytes) |
|---|---|---|
| 2 | 0.0007 | 0.000064 |
| 3 | 0.003 | 0.00043 |
| 4 | 0.25 | 0.04 |
| 5 | 1,018 | 70 |
| 6 | ~15,000,000 | ~3,000,000 |

FIG. 13

1. $a^{n-1} \leftarrow$ random bit string of length $2n$
2. for $j = 0$ to $n - 2$ do
   if InnerProduct($a^{n-1}, a^j$) == 1 then $a^{n-1} \leftarrow a^{n-1} \oplus b^j$
   if InnerProduct($a^{n-1}, b^j$) == 1 then $a^{n-1} \leftarrow a^{n-1} \oplus a^j$
   end for
3. if $a^{n-1} == 0$ then go to Step 1
4. $b^{n-1} \leftarrow$ random bit string of length $2n$
5. if InnerProduct($a^{n-1}, b^{n-1}$) == 0 then go to Step 4
6. for $j = 0$ to $n - 2$ do
   if InnerProduct($b^{n-1}, a^j$) == 1 then $b^{n-1} \leftarrow b^{n-1} \oplus b^j$
   if InnerProduct($b^{n-1}, b^j$) == 1 then $b^{n-1} \leftarrow b^{n-1} \oplus a^j$
   end for

FIG. 14

EFFICIENT SYNTHESIS OF OPTIMAL MULTI-QUBIT CLIFFORD CIRCUITS

BACKGROUND

The subject disclosure relates to quantum circuits, and more specifically to the efficient synthesis of optimal multi-qubit Clifford circuits.

A quantum circuit, also referred to as a quantum gate and/or a quantum operator, is a transformation that operates on a set of qubits. For any suitable set of n qubits (e.g., for any suitable positive integer n), an n-qubit quantum circuit can be represented by a unitary $2^n \times 2^n$ matrix, which can operate on a $2^n$ vector representing the collective quantum state (e.g., representing the superposition of basis states) of the set of n qubits. Quantum circuits can be combined in series via matrix multiplication, and quantum circuits can be combined in parallel via tensor products.

Clifford circuits represent a particular and useful subset of quantum circuits. Specifically, Clifford circuits can be quantum circuits that are composed of Hadamard gates (H), Phase gates (P and/or S), and/or Controlled-Not gates (CNOT), or an equivalent library. Clifford circuits generate a finite group known as the Clifford group. Clifford circuits map Pauli operators (and/or tensor products of Pauli operators) to other Pauli operators (and/or to other tensor products of Pauli operators). In various instances, Clifford circuits can play a crucial role in quantum computation (e.g., can be implemented to facilitate randomized benchmarking, to facilitate quantum fault tolerance and/or error correction protocols, to facilitate shadow tomography, and/or for various other uses).

Because Clifford circuits can play such a crucial role in quantum computation, it can be desired to minimize the computational costs associated with Clifford circuits, so as to save computational resources and/or to reduce computing times. In various aspects, the cost of a Clifford circuit can be considered to be the number of entangling gates (e.g., CNOT gates) which are implemented in the Clifford circuit. So, a Clifford circuit that includes no CNOT gates has a cost of 0, a Clifford circuit that includes one CNOT gate has a cost of 1, a Clifford circuit that includes two CNOT gates has a cost of 2, and so on. When given a particular element of the Clifford group, it can be desired to identify/determine an optimal Clifford circuit implementing this element, with the optimality defined as the minimum entangling-gate cost. In various aspects, the optimal version of the particular Clifford circuit can be determined/identified by performing a search, query, and/or computation over a library of optimal Clifford circuits. A device/system that can electronically generate a library of optimal Clifford circuits can be known as a Clifford synthesizer and/or compiler.

Several technical problems afflict conventional Clifford synthesizers and/or Clifford compilers. Specifically, some conventional Clifford synthesizer and/or compilers function by electronically computing a library of optimal Clifford circuits for all possible Clifford group elements with a given number of qubits. However, the number of Clifford group elements grows intractably large with the number of qubits. Specifically, there are 6 group elements for 1 qubit, there are 720 group elements for 2 qubits, there are about 1.5 million group elements for 3 qubits, there are over 47.3 billion group elements for 4 qubits, there are over 24.8 quadrillion group elements for 5 qubits, there are over $2*10^{23}$ group elements for 6-qubits, and/or so on. Because of this intractability, such conventional Clifford synthesizers and/or compilers have only successfully computed/synthesized libraries of optimal Clifford circuits for up to four qubits, and such conventional Clifford synthesizers and/or compilers require large amounts of time to do so (e.g., around 5,000 seconds to construct a library of optimal 4-qubit Clifford circuits). Other conventional Clifford synthesizers and/or compilers function by implementing efficient formulas that only exist for Clifford circuits operating on three or fewer qubits. Still other conventional Clifford synthesizers and/or compilers function by merely heuristically synthesizing optimal Clifford circuits rather than computing actually-optimal Clifford circuits (e.g., heuristically-synthesized circuits can be far from optimal). Overall, existing/conventional Clifford synthesizers and/or compilers simply cannot efficiently compute/synthesize optimal Clifford circuit libraries for five or more qubits.

Systems and/or techniques that can ameliorate and/or solve one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate efficient synthesis of optimal multi-qubit Clifford circuits are described.

According to one or more embodiments, a system is provided. The system can comprise a memory that can store computer-executable instructions. The system can further comprise a processor that can be operably coupled to the memory and that can execute the computer-executable instructions stored in the memory. In various embodiments, this can cause the processor to receive as input a number n representing a quantity of qubits. In various aspects, this can further cause the processor to generate, via a cost-invariant reduction function, as output a library of different n-qubit canonical representatives. In various aspects, the different n-qubit canonical representatives can respectively correspond to different cost-invariant equivalence classes of n-qubit Clifford group elements. In various embodiments, a first n-qubit canonical representative in the library of different n-qubit canonical representatives can respectively correspond to a first equivalence class of the different cost-invariant equivalence classes. In various cases, the first n-qubit canonical representative can be a lexicographically minimum element in the first equivalence class. In various embodiments, the first n-qubit canonical representative can be specified up to a phase by a set of bit strings. In various cases, the bit strings can indicate how the first n-qubit canonical representative maps various Pauli operators to other Pauli operators. In various cases, the first n-qubit canonical representative can be stored in the library according to a thin matrix representation. In various cases, the thin matrix representation can omit a portion of the set of bit strings.

According to one or more embodiments, the above-described system can be implemented as a computer-implemented method and/or computer program product.

According to one or more embodiments, a system is provided. The system can comprise a memory that can store computer-executable instructions. The system can further comprise a processor that can be operably coupled to the memory and that can execute the computer-executable instructions stored in the memory. In various embodiments, this can cause the processor to receive as input a first Clifford group element. In various instances, this can further cause the processor to search a database of canonical representatives. In various cases, different canonical representatives in the database can respectively correspond to different cost-invariant equivalence classes of Clifford group elements. In various aspects, the processor can identify, based on the search, a second Clifford group element that differs from the input group element by a single entangling gate and has a lower entangling-gate cost than the input group element. In various embodiments, the system can generate the database of canonical representatives by computing, via a cost-invariant reduction function, lexicographically minimum elements in the different cost-invariant equivalence classes. In various embodiments, the canonical representatives can be stored in the database according to a thin matrix binary format.

According to one or more embodiments, the above-described system can be implemented as a computer-implemented method and/or computer program product.

DESCRIPTION OF THE DRAWINGS

FIG. 8 illustrates an exemplary, non-limiting computer-implemented algorithm that facilitates efficient synthesis of optimal multi-qubit Clifford circuits via a cost-invariant reduction function in accordance with one or more embodiments described herein.

FIG. 9 illustrates exemplary, non-limiting Clifford circuit counts and equivalence class counts in accordance with one or more embodiments described herein.

FIG. 11 illustrates an exemplary, non-limiting tableaux representation in accordance with one or more embodiments described herein.

FIG. 13 illustrates exemplary, non-limiting results in accordance with one or more embodiments described herein.

FIG. 14 illustrates an exemplary, non-limiting computer-implemented algorithm that facilitates thin matrix representation of Clifford circuits in accordance with one or more embodiments described herein.

DETAILED DESCRIPTION

Figure 1:
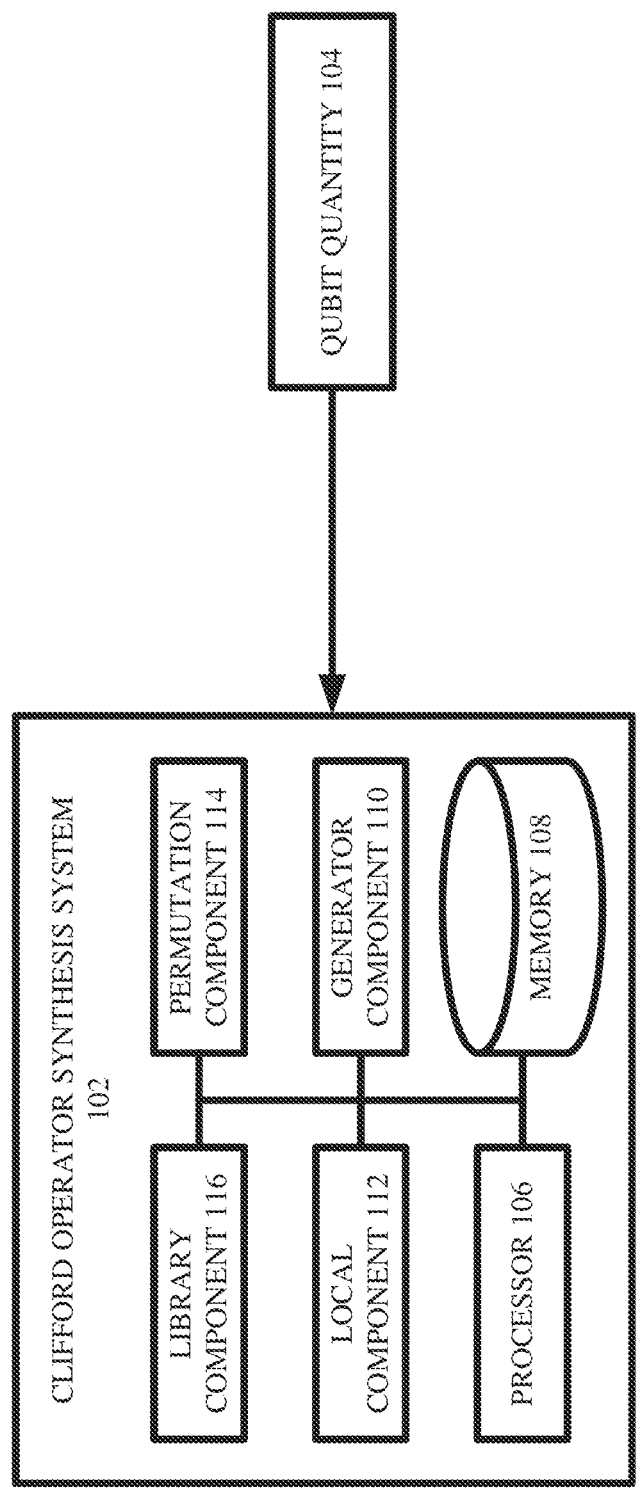
FIG. 1 illustrates a block diagram of an example, non-limiting system that facilitates efficient synthesis of optimal multi-qubit Clifford circuits in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, a quantum circuit, also referred to as a quantum gate, can be a mathematical transformation that can operate on a basis state of a set of qubits. For any suitable set of n qubits (e.g., for any suitable positive integer n), an n-qubit quantum circuit can be represented by a unitary $2^n \times 2^n$ matrix, which can operate (e.g., via matrix multiplication) on a $2^n$ vector representing the collective quantum state (e.g., representing the superposition of basis states) of the set of n qubits. Quantum circuits can be combined in series via matrix multiplication, and quantum circuits can be combined in parallel via tensor products (e.g., also referred to as Kronecker products).

Clifford circuits represent a useful subset of quantum circuits. Specifically, Clifford circuits can be quantum circuits that are composed of Hadamard gates (H), Phase gates (P and/or S), and/or Controlled-Not gates (CNOT). As those of ordinary skill in the art can appreciate, such gates can be given as:

$$H = \frac{1}{\sqrt{2}}\begin{bmatrix} 1 & 1 \\ 1 & -1 \end{bmatrix}; P = \begin{bmatrix} 1 & 0 \\ 0 & i \end{bmatrix}; CNOT = \begin{bmatrix} 1 & 0 & 0 & 0 \\ 0 & 1 & 0 & 0 \\ 0 & 0 & 0 & 1 \\ 0 & 0 & 1 & 0 \end{bmatrix}$$

where $i=\sqrt{-1}$. Clifford gates generate a finite group known as the Clifford group. Each Clifford circuit implements a unique element of the Clifford group. However, a given element of the Clifford group can be implemented by (infinitely) many different Clifford circuits.

In various aspects, Clifford circuits can map Pauli operators (and/or tensor products of Pauli operators) to other Pauli operators (and/or to other tensor products of Pauli operators). As those of ordinary skill in the art can appreciate, the Pauli operators can be given as:

$$I = \begin{bmatrix} 1 & 0 \\ 0 & 1 \end{bmatrix}; X = \begin{bmatrix} 0 & 1 \\ 1 & 0 \end{bmatrix}; Y = \begin{bmatrix} 0 & -i \\ i & 0 \end{bmatrix}; Z = \begin{bmatrix} 1 & 0 \\ 0 & -1 \end{bmatrix}$$

In various instances, Clifford circuits can play a crucial role in quantum computation. For instance, Clifford circuits can be implemented to facilitate randomized benchmarking (e.g., random Clifford circuits can facilitate scalable noise characterization for multi-qubit devices and/or can be insensitive to state preparation/measurement errors), to facilitate quantum fault tolerance and/or error correction protocols (e.g., Clifford circuits in conjunction with the Toffoli gate can facilitate magic state distillation and/or encoding/decoding of stabilizer-type codes), to facilitate shadow tomography (e.g., a random Clifford basis can be implemented to approximate multi-qubit states via classical shadow techniques), and/or to facilitate peep-hole optimization. Various other use-cases for Clifford circuits can exist.

Because Clifford circuits can play such a crucial role in quantum computation, it can be desired to minimize the computational costs associated with Clifford circuits, so as to save computational resources and/or to reduce computing times. In various aspects, the cost of a Clifford circuit can be measured in terms of the number of entangling gates (e.g., CNOT gates) which are implemented in the Clifford circuit. That is, a Clifford circuit that includes no CNOT gates can have a cost of 0, a Clifford circuit that includes one CNOT gate can have a cost of 1, a Clifford circuit that includes two CNOT gates can have a cost of 2, and so on. From such a perspective, single-qubit gates (e.g., H and/or P) can be considered as being free. When given a particular element of the Clifford group, it can be desired to identify/determine an optimal Clifford circuit that implements this group element and has the minimum number of entangling gates (e.g., the minimum CNOT cost). As mentioned above, the optimal Clifford circuit can be determined/identified by performing a search, query, and/or computation over a library of optimal Clifford circuits. A device/system that can electronically generate a library of optimal Clifford circuits can be known as a Clifford synthesizer and/or compiler.

Many technical problems and/or limitations plague conventional Clifford synthesizers and/or compilers. Specifically, some conventional Clifford synthesizers and/or compilers function by electronically computing a library (e.g., a database) of all possible optimal Clifford circuits for a given number of qubits. However, the number of possible Clifford group elements grows intractably large with the number of qubits. Specifically, there are 6 group elements for 1 qubit, there are 720 group elements for 2 qubits, there are about 1.5 million group elements for 3 qubits, there are over 47.3 billion group elements for 4 qubits, there are over 24.8 quadrillion group elements for 5 qubits, there are over $2*10^{23}$ group elements for 6-qubits, and/or so on. Indeed, the number $2*10^{23}$ is so large that if $2*10^{23}$ pieces of paper were stacked/piled on top of each other, it would take 1000 years to get from one end of the stack/pile to the other end by flying at the speed of light. In still other words, the number $2*10^{23}$ is about one third the size of a mole (e.g., about one third of Avogadro's number). Because of this intractability, such conventional Clifford synthesizers and/or compilers have only successfully computed/synthesized libraries of optimal Clifford circuits for up to four qubits, and such conventional Clifford synthesizers and/or compilers require large amounts of time to do so (e.g., around 5,000 seconds to construct a library of optimal 4-qubit Clifford circuits). Other conventional Clifford synthesizers and/or compilers function by implementing efficient formulas that exist only for Clifford circuits operating on three or fewer qubits. Still other conventional Clifford synthesizers and/or compilers function by employing heuristics, which do not guarantee optimality. Overall, due to the intractability problem, existing/conventional Clifford synthesizers and/or compilers simply cannot efficiently compute/synthesize optimal Clifford circuit libraries for five or more qubits.

Various embodiments of the invention can address one or more of these technical problems. Specifically, various embodiments of the invention can provide systems and/or techniques that can facilitate efficient synthesis of optimal multi-qubit Clifford circuits. In other words, various embodiments of the invention can be considered as a technical solution to the intractability problem discussed above (e.g., can be considered as improved Clifford synthesizers and/or compilers).

Specifically, the inventors of various embodiments of the invention recognized that, in various cases, a library of optimal multi-qubit Clifford circuits can be efficiently computed, synthesized, and/or generated by defining a novel equivalence relation between Clifford group elements and/or Clifford circuits. In particular, as described herein, a Clifford circuit U and a Clifford circuit V can be considered equivalent in terms of entangling-gate cost (and/or in terms of circuit shape) if:

$$V = WLUL'W^{-1}$$

for some local (that is, tensor products of single-qubit) Clifford circuits L and L' and for some qubit permutation W. If U and V satisfy this equivalence relation, U and V can be said to belong to the same cost-invariant equivalence class. As explained above, the number of optimal multi-qubit Clifford circuits grows intractably with the number of qubits. However, the inventors of various embodiments of the invention recognized that such intractability can be combatted and/or mitigated by factoring out optimal multi-qubit Clifford circuits that are members of the same cost-invariant equivalence class. In other words, whereas conventional Clifford synthesizers and/or compilers attempt to synthesize every single optimal n-qubit Clifford circuit for a particular positive integer n (which becomes intractable for n≥5), various embodiments of the invention can synthesize a library of optimal n-qubit Clifford circuits by synthesizing a single optimal n-qubit Clifford circuit for each equivalence class. In various instances, the single optimal n-qubit Clifford circuit that is synthesized from a particular cost-invariant equivalence class can be referred to as a canonical representative of that particular cost-invariant equivalence class. In various aspects, as explained further herein, the inventors of various embodiments of the invention devised a novel function (e.g., referred to as a cost-invariant reduction function) that can be implemented by a computer processor to efficiently compute a canonical representative from any suitable cost-invariant equivalence class of Clifford circuits. Further, in various instances, the inventors of various embodiments of the invention structured the cost-invariant reduction function so as to compute the lexicographically minimum element in any suitable cost-invariant equivalence class (e.g., when the cost-invariant reduction function is executed, it is mathematically guaranteed to return/yield as the canonical representative the lexicographically minimum element in a given equivalence class). Moreover, as explained herein, the inventors of various embodiments of the invention structured the cost-invariant reduction function so as to guarantee the optimality of any resulting canonical representative (e.g., when the cost-invariant reduction function is executed, it is mathematically guaranteed to yield an optimal Clifford circuit as the canonical representative). In various aspects, further efficiency benefits can be gained by pruning relevant search spaces that are associated with the cost-invariant reduction function.

A significant benefit of various embodiments of the invention is as follows. For any suitable positive integer n, there are far fewer (e.g., many orders of magnitude fewer) equivalence classes of optimal n-qubit Clifford circuits than there are optimal n-qubit Clifford circuits. For instance, there are about $2*10^{23}$ different optimal 6-qubit Clifford circuits, but there are only on the order of $10^{11}$ different equivalence classes of optimal 6-qubit Clifford circuits, which represents a reduction of about twelve orders of magnitude for n=6. It can thus be significantly more efficient in terms of computing time and/or computing resources to generate, via the cost-invariant reduction function as described herein, one canonical representative for each cost-invariant equivalence class than it can be to generate every possible optimal Clifford circuit. Therefore, various embodiments of the invention can involve systems and/or computer-implemented methods that can receive as input an indication of a number of qubits n, and that can leverage the cost-invariant equivalence classes and/or the cost-invariant reduction function as described herein to generate/synthesize as output a library of n-qubit canonical representatives. It should be noted that, in various aspects, the library of n-qubit canonical representatives can span and/or be representative of the total set of possible n-qubit Clifford circuits. Accordingly, the library of n-qubit canonical representatives can subsequently be implemented, deployed, and/or utilized for any suitable quantum computing application (e.g., once the library/database of canonical representatives is generated, any suitable search, query, and/or computation over the library/database can be facilitated, such as searches/queries/computations to identify/determine optimal versions of given n-qubit Clifford circuits). As shown in more detail below, various embodiments of the invention can efficiently generate libraries/databases of optimal n-qubit Clifford circuits for n≤6, which is a significant improvement over conventional Clifford compiling systems/techniques since such conventional systems/techniques cannot practicably function for n>4. In other words, various embodiments of the invention constitute a notable technical improvement in the field of quantum computation.

Note that various embodiments of the invention can also generate libraries/databases of optimal n-qubit Clifford circuits for n>6.

In various aspects, the inventors of various embodiments of the invention devised a further efficiency benefit in the form of thin matrix representation. Specifically, a Clifford circuit can be stored in a computing library, database, and/or any other suitable data structure as a set of bit strings (e.g., can be stored in binary format). In various aspects, such set of bit strings can represent the Clifford circuit by indicating how the Clifford circuit maps various Pauli operators to various other Pauli operators. Conventionally, such set of bit strings can be neatly represented by two 72-bit binary integers. However, this can be suboptimal because bitwise operations in modern computing devices are generally performed on 64-bit binary integers. Accordingly, conventional systems/techniques are forced to convert the two 72-bit binary integers into more than two 64-bit binary integers to facilitate bitwise operations (e.g., modern computing devices are simply not configured to perform bitwise operations on 72-bit binary integers). To solve this technical problem, as explained in more detail below, the inventors of various embodiments of the invention devised a technique (referred to as thin matrix binary format and/or thin matrix representation) by which the set of bit strings can be reduced from two 72-bit binary integers to two 60-bit binary integers without losing information/data. Accordingly, bitwise operations can be performed on the set of bit strings (and thus on the Clifford circuit) when thin matrix representation is implemented.

Various embodiments of the invention can be employed to use hardware and/or software to solve problems that are highly technical in nature (e.g., to facilitate efficient synthesis of optimal multi-qubit Clifford circuits), that are not abstract and that cannot be performed as a set of mental acts by a human. Further, some of the processes performed can be performed by a specialized computer (e.g., receiving, by a device operatively coupled to a processor, as input a number n representing a quantity of qubits; and generating, by the device and via a cost-invariant reduction function, as output a library of different n-qubit canonical representatives that respectively correspond to different cost-invariant equivalence classes of n-qubit Clifford circuits; wherein a first n-qubit canonical representative in the library of different n-qubit canonical representatives respectively corresponds to a first equivalence class of the different cost-invariant equivalence classes, and wherein the first n-qubit canonical representative is a lexicographically minimum element (e.g., a lexicographically minimum reduced tableau) in the first equivalence class). Such defined tasks are not typically performed manually by humans. Moreover, neither the human mind nor a human with pen and paper can execute a cost-invariant reduction function to electronically generate/synthesize a library of n-qubit canonical representatives corresponding to cost-invariant equivalence classes of Clifford circuits. Instead, various embodiments of the invention are inherently and inextricably tied to computer technology and cannot be implemented outside of a quantum computing environment (e.g., various embodiments of the invention are directed to systems and/or computer-implemented methods that can overcome the Clifford circuit intractability problem that plagues conventional Clifford synthesizers and/or compilers; accordingly, various embodiments of the invention can be considered as an improved Clifford synthesizer and/or compiler, and Clifford synthesizers and/or compilers are devices that are utilized in the field of quantum computation and simply cannot exist outside of computing environments).

In various instances, embodiments of the invention can integrate into a practical application the disclosed teachings regarding efficient synthesis of optimal multi-qubit Clifford circuits. Indeed, as described herein, various embodiments of the invention, which can take the form of systems and/or computer-implemented methods, can be considered as improved Clifford synthesizers and/or compilers. Conventional Clifford synthesizers and/or compilers are combinations of computer hardware and/or computer software that synthesize libraries of optimal Clifford circuits and/or that perform searches/computations on such libraries. As explained above, such conventional Clifford synthesizers and/or compilers are significantly limited in their functionality due to the intractability problem (e.g., such conventional Clifford synthesizers and/or compilers generally compute every possible optimal Clifford circuit for a given number of qubits, which is intractable for Clifford circuits that operate on more than four qubits; other conventional Clifford synthesizers and/or compilers leverage special formulas that only exist for Clifford circuits that operate on three or fewer qubits). As explained herein, however, various embodiments of the invention offer technical solutions to the intractability problem. Specifically, various embodiments of the invention can leverage a cost-invariant reduction function, as defined herein, to generate a library of optimal canonical representatives. In other words, rather than computing every single optimal Clifford circuit for a given number of qubits, embodiments of the invention can compute a single optimal Clifford circuit (e.g., a canonical representative) from each cost-invariant equivalence class of Clifford circuits for a given number of qubits. Since the number of cost-invariant equivalence classes is much smaller (e.g., several orders of magnitude smaller) than the number of optimal Clifford circuits for a given number of qubits, the intractability problem can be avoided at least for 5-qubit and 6-qubit Clifford circuits. The result can be that various embodiments of the invention can efficiently generate/synthesize a library of optimal n-qubit Clifford circuits (e.g., a library of canonical representatives) for $n \leq 6$, whereas conventional Clifford synthesizers and/or compilers can only generate libraries of optimal n-qubit Clifford circuits for $n \leq 4$. In other words, various embodiments of the invention enable Clifford synthesizers and/or compilers to perform functions which they cannot perform conventionally. Not only do systems and/or techniques that perform efficient synthesis of optimal multi-qubit Clifford circuits clearly constitute a useful and practical application of computers, but systems and/or techniques that can ameliorate the intractability problem that restricts conventional Clifford synthesizers and/or compilers clearly constitute a concrete and tangible technical improvement in the field of quantum computation.

Furthermore, various embodiments of the invention can control real-world devices based on the disclosed teachings. For example, embodiments of the invention can generate a real-world database of optimal multi-qubit Clifford circuits. Moreover, embodiments of the invention can receive as input a real-world Clifford circuit and can leverage the real-world database to determine/identify an optimal version of the real-world Clifford circuit (e.g., a version of the real-world Clifford circuit that has fewer CNOT gates). Such an optimal version of the real-world Clifford circuit can then be applied and/or implemented on a real-world quantum computing system (e.g., can be applied to real-world qubits). Such embodiments thus constitute a concrete and tangible technical improvement in the field of quantum computation.

It should be appreciated that the figures and the herein disclosure are exemplary and non-limiting.

FIG. 1 illustrates a block diagram of an example, non-limiting system 100 that can facilitate efficient synthesis of optimal multi-qubit Clifford circuits in accordance with one or more embodiments described herein. In various aspects, a Clifford operator synthesis system 102 can be any suitable combination of computer hardware and/or computer software that can electronically receive as input a qubit quantity 104 and that can electronically produce as output a library (e.g., a database) of optimal Clifford circuits based on the qubit quantity 104. That is, the Clifford operator synthesis system 102 can be considered as a Clifford synthesizer and/or compiler.

In various embodiments, the qubit quantity 104 can be represented by the variable n. In various aspects, n can be any suitable positive integer. In some cases, n can be any suitable positive integer from 1 to 6, inclusively. In various cases, the Clifford operator synthesis system 102 can electronically receive the qubit quantity 104 (e.g., can electronically receive an indication of the value of n) via any suitable input and/or interface technique (e.g., the Clifford operator synthesis system 102 can retrieve the qubit quantity 104 from any suitable centralized and/or distributed data structure that is accessible to the Clifford operator synthesis system 102; a user/operator (whether human or otherwise) of the Clifford operator synthesis system 102 can provide input that identifies the qubit quantity 104 such as through buttons, keyboards, keypads, touchscreens, and/or voice commands; the Clifford operator synthesis system 102 can be preprogrammed with the qubit quantity 104). As explained herein, based on n (e.g., based on the qubit quantity 104), the Clifford operator synthesis system 102 can be configured to efficiently synthesize a library/database of n-qubit canonical representatives.

In various embodiments, the Clifford operator synthesis system 102 can comprise a processor 106 (e.g., computer processing unit, microprocessor) and a computer-readable memory 108 that is operably connected to the processor 106. The memory 108 can store computer-executable instructions which, upon execution by the processor 106, can cause the processor 106 and/or other components of the Clifford operator synthesis system 102 (e.g., generator component 110, local component 112, permutation component 114, library component 116) to perform one or more acts. In various embodiments, the memory 108 can store computer-executable components (e.g., generator component 110, local component 112, permutation component 114, library component 116), and the processor 106 can execute the computer-executable components.

In various embodiments, the Clifford operator synthesis system 102 can comprise a generator component 110. In various aspects, the generator component 110 can electronically store and/or maintain a generator set of Clifford circuits. In various aspects, the generator set can contain various cost-1 Clifford circuits (e.g., various Clifford circuits that each involve one CNOT gate) which can be combined in series and/or in parallel (e.g., via matrix multiplication and/or tensor products) in various ways so as to generate the total set of n-qubit Clifford circuits. In various aspects, the generator set can contain nine particular cost-1 Clifford circuits, as shown later in FIG. 3. Those having ordinary skill in the art will appreciate the concept/definition of a generator set of Clifford circuits. In various instances, the generator component 110 can electronically store and/or maintain the generator set in any suitable fashion and/or via any suitable technique (e.g., the generator component 110 can identify and/or look up the generator set in a table and/or in any other suitable data structure that is electronically accessible to the generator component 110; the generator component 110 can be preprogrammed with the generator set; and/or so on).

In various embodiments, the Clifford operator synthesis system 102 can comprise a local component 112. In various aspects, the local component 112 can electronically store and/or maintain a local subset of Clifford circuits. In various aspects, the local subset can contain n-qubit Clifford circuits that are tensor products of single-qubit Clifford circuits. Those having ordinary skill in the art will appreciate the concept/definition of a local subset of Clifford circuits. In various instances, the local component 112 can electronically store and/or maintain the local subset in any suitable fashion and/or via any suitable technique (e.g., the local component 112 can identify and/or look up the local subset in a table and/or in any other suitable data structure that is electronically accessible to the local component 112; the local component 112 can be preprogrammed with the local subset; and/or so on).

In various embodiments, the Clifford operator synthesis system 102 can comprise a permutation component 114. In various aspects, the permutation component 114 can electronically store and/or maintain a set of n-qubit permutations. In various aspects, the set of n-qubit permutations can contain various circuits that swap and/or permutate the values of various qubits with each other. Those having ordinary skill in the art will appreciate the concept/definition of a set of n-qubit permutations. In various instances, the permutation component 114 can electronically store and/or maintain the set of n-qubit permutations in any suitable fashion and/or via any suitable technique (e.g., the permutation component 114 can identify and/or look up the local subset in a table and/or in any other suitable data structure that is electronically accessible to the permutation component 114; the permutation component 114 can be preprogrammed with the set of n-qubit permutations; and/or so on).

In various embodiments, the Clifford operator synthesis system 102 can comprise a library component 116. In various aspects, the library component 116 can comprise a cost-invariant reduction function. In various instances, iterative electronic execution of the cost-invariant reduction function can electronically generate and/or synthesize a library/database of n-qubit canonical representatives based on the generator set, the local subset, and the permutation set. In other words, the cost-invariant reduction function, as defined herein, can leverage the generator set, the local subset, and the permutation set as invariant operators under the computation of optimal circuits. In various instances, the cost-invariant reduction function can be mathematically configured such that iterative application/execution of the cost-invariant reduction function yields one n-qubit canonical representative for each cost-invariant equivalence class of n-qubit Clifford circuits. In various aspects, the cost-invariant reduction function can be further mathematically configured to guarantee optimality (e.g., to guarantee that each canonical representative has a minimum CNOT count). In various instances, the cost-invariant reduction function can be still further mathematically configured to guarantee that each canonical representative is a lexicographically minimum circuit in its corresponding cost-invariant equivalence class. Furthermore, the cost-invariant reduction function, as described herein, can be efficient to execute.

In various cases, the resulting library/database of n-qubit canonical representatives can span and/or can be representative of the entire set of optimal n-qubit Clifford circuits. Accordingly, the resulting library/database of n-qubit canonical representatives can be implemented, utilized, leveraged, and/or applied in the field of quantum computation in any suitable way as could a library/database of all optimal n-qubit Clifford circuits. For example, given a suboptimal n-qubit Clifford circuit, a library/database of all optimal n-qubit Clifford circuits can be leveraged to identify/determine an optimal version of the suboptimal Clifford circuit having fewer (e.g., provably minimal) CNOT gates. Similarly, given a suboptimal n-qubit Clifford circuit, a library/database of n-qubit canonical representatives can likewise be leveraged to identify/determine an optimal version of the suboptimal n-qubit Clifford circuit, but the library/database of n-qubit canonical representatives can be electronically synthesized much more quickly/efficiently than the library/database of all optimal n-qubit Clifford circuits. Indeed, for n>4, it is not even possible (due to intractability) to electronically synthesize a library/database of all optimal n-qubit Clifford circuits, but it is possible/practicable to electronically synthesize a library/database of n-qubit canonical representatives.

In other words, the library component 116 can electronically generate a library/database of optimal n-qubit Clifford circuits much more quickly/efficiently than conventional systems/techniques allow. Having a library/database of optimal Clifford circuits can be very useful from a quantum computation perspective. Clifford synthesizers and/or compilers are combinations of computer hardware and/or software that can generate such libraries/databases. As explained above, conventional Clifford synthesizers and/or compilers function by synthesizing/computing every optimal n-qubit Clifford circuit, which becomes intractable for n>4. In stark contrast, the library component 116 does not attempt to synthesize every optimal n-qubit Clifford circuit. Instead, the library component 116 can synthesize an n-qubit canonical representative for each cost-invariant equivalence class (e.g., if there are q cost-invariant equivalence classes, the library component 116 can generate q canonical representatives). Since there can be many orders of magnitude fewer cost-invariant equivalence classes of n-qubit Clifford circuits than there are n-qubit Clifford circuits themselves, the library component 116 can avoid (and/or at least mitigate) the intractability problem for n>4 (e.g., particularly for n=5 and/or for n=6). This constitutes a concrete and tangible technical improved as compared to existing Clifford circuit synthesis techniques.

Figure 2:
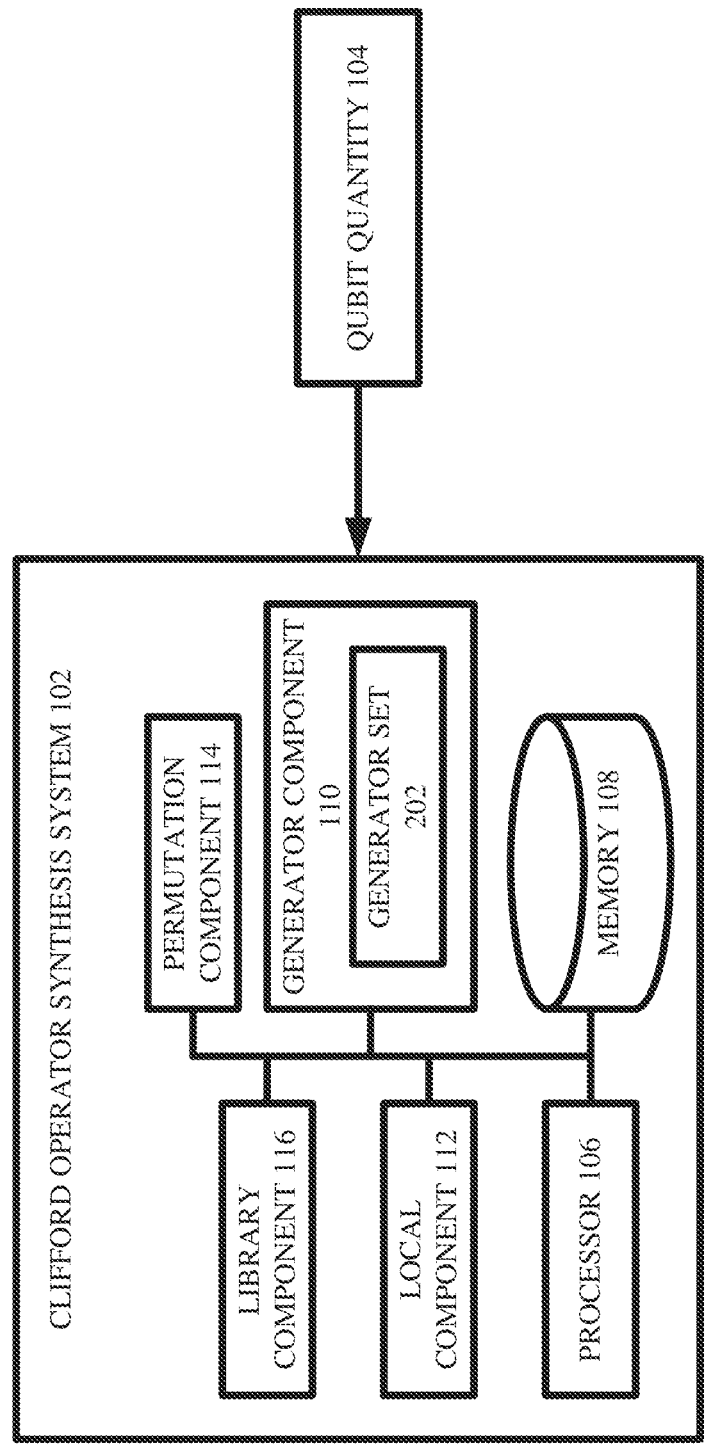
FIG. 2 illustrates a block diagram of an example, non-limiting system including a generator set that facilitates efficient synthesis of optimal multi-qubit Clifford circuits in accordance with one or more embodiments described herein.

FIG. 2 illustrates a block diagram of an example, non-limiting system 200 including a generator set that can facilitate efficient synthesis of optimal multi-qubit Clifford circuits in accordance with one or more embodiments described herein. As shown, the system 200 can, in some cases, comprise the same components as the system 100, and can further comprise a generator set 202.

In various aspects, the generator component 110 can electronically store and/or maintain in any suitably fashion the generator set 202. In various instances, the generator set 202 can comprise cost-1 Clifford circuits (which can be referred to as generators and/or generator circuits) that can be combined in various ways via matrix multiplication and/or via tensor products to generate and/or yield the entire set of n-qubit Clifford circuits. Because each generator in the generator set 202 can be a cost-1 Clifford circuit, each generator in the generator set 202 can comprise one CNOT gate. A particular exemplary and non-limiting embodiment of the generator set 202 is depicted in FIG. 3.

As mentioned above, the generator component 110 can determine, identify, and/or learn the generator set 202 via any suitable technique (e.g., the generator component 110 can retrieve and/or look up the generator set 202 in any suitable data structure that is electronically accessible to the generator component 110; the generator component 110 can be preprogrammed to know the generator set 202).

Figure 3:
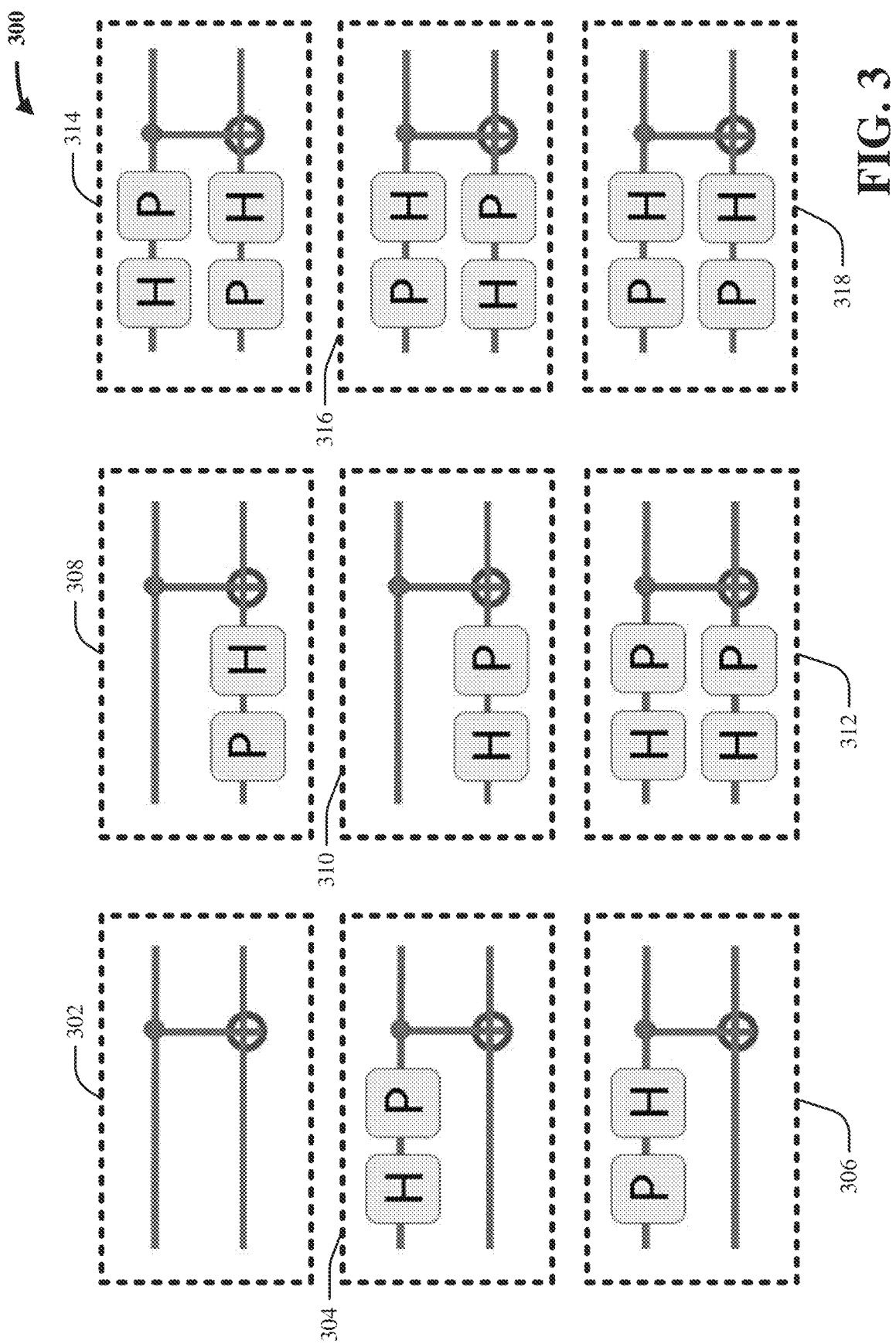
FIG. 3 illustrates exemplary, non-limiting circuit diagrams of a generator set in accordance with one or more embodiments described herein.

FIG. 3 illustrates exemplary, non-limiting circuit diagrams of a generator set in accordance with one or more embodiments described herein. In other words, FIG. 3 depicts an exemplary and non-limiting embodiment of the generator set 202.

As shown, in an exemplary and non-limiting embodiment, the generator set 202 can comprise nine generators 302-318. As shown, each of the nine generators 302-318 can be a cost-1 Clifford circuit (e.g., each generator can be composed of H gates, P gates, and one CNOT gate; and/or an equivalent circuit over a different library). As shown, the generator set 202 can, in some cases, be formed by implementing different orderings of serially-coupled H gates and P gates in front of a CNOT gate. For instance, the generator 302 can simply be a lone CNOT gate. In various aspects, the generator 304 can have a serially-coupled H gate and P gate applied prior to a CNOT gate and applied to the control qubit of the CNOT gate (e.g., in such case, two serially-coupled identity gates can be applied to the target qubit prior to the CNOT gate). In various instances, the generator 306 can have a serially-coupled P gate and H gate (e.g., in reverse order as compared to the generator 304) applied prior to a CNOT gate and applied to the control qubit of the CNOT gate (e.g., in such case, two serially-coupled identity gates can be applied to the target qubit prior to the CNOT gate). In various cases, the generator 308 can have a serially-coupled P gate and H gate applied prior to a CNOT gate and applied to the target qubit of the CNOT gate (e.g., in such case, two serially-coupled identity gates can be applied to the control qubit prior to the CNOT gate). In various aspects, the generator 310 can have a serially-coupled H gate and P gate (e.g., in reverse order as compared to the generator 308) applied prior to a CNOT gate and applied to the target qubit of the CNOT gate (e.g., in such case, two serially-coupled identity gates can be applied to the control qubit prior to the CNOT gate). In various instances, the generator 312 can have a serially-coupled H gate and P gate applied prior to a CNOT gate and applied to both the control qubit and the target qubit of the CNOT gate. In various cases, the generator 314 can have a serially-coupled H gate and P gate applied prior to a CNOT gate and applied to the control qubit of the CNOT gate, and can have a serially-coupled P gate and H gate (e.g., in reverse order) applied prior to the CNOT gate and applied to the target qubit of the CNOT gate. In various aspects, the generator 316 can have a serially-coupled P gate and H gate applied prior to a CNOT gate and applied to the control qubit of the CNOT gate, and can have a serially-coupled H gate and P gate (e.g., in reverse order) applied prior to the CNOT gate and applied to the target qubit of the CNOT gate. In various instances, the generator 318 can have a serially-coupled P gate and H gate applied prior to a CNOT gate and applied to both the control qubit and the target qubit of the CNOT gate.

Although the generators 302-318 as depicted are 2-qubit Clifford circuits, those having ordinary skill in the art will appreciate that the generators 302-318 can be combined in parallel via tensor products with themselves and/or via tensor products with identity matrices in order to generate n-qubit Clifford circuits.

Figure 4:
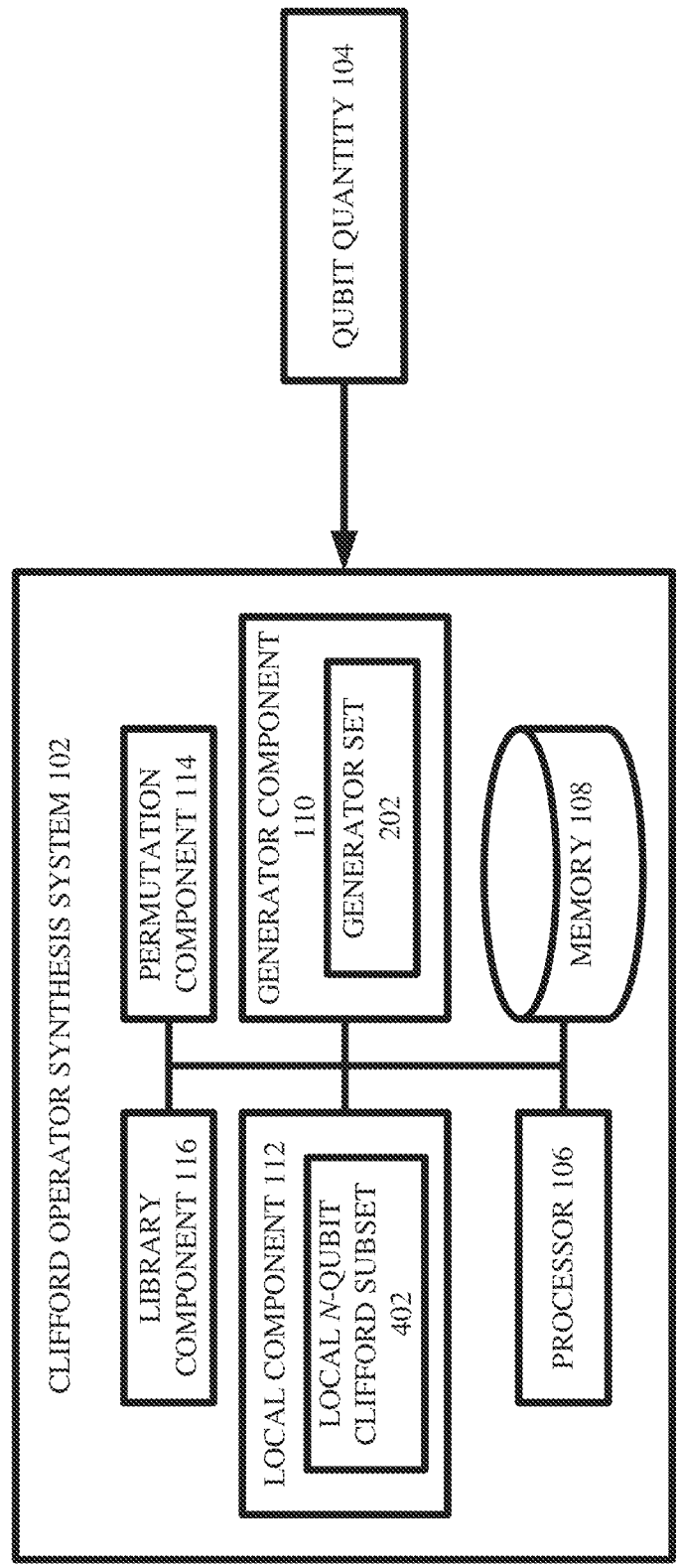
FIG. 4 illustrates a block diagram of an example, non-limiting system including a local n-qubit Clifford subset that facilitates efficient synthesis of optimal multi-qubit Clifford circuits in accordance with one or more embodiments described herein.

FIG. 4 illustrates a block diagram of an example, non-limiting system 400 including a local n-qubit Clifford subset that can facilitate efficient synthesis of optimal multi-qubit Clifford circuits in accordance with one or more embodiments described herein. As shown, the system 400 can, in some cases, comprise the same components as the system 200, and can further comprise a local n-qubit Clifford subset 402.

In various aspects, the local component 112 can electronically store and/or maintain in any suitably fashion the local n-qubit Clifford subset 402. In various instances, a Clifford circuit can be considered as local if the Clifford circuit is a tensor product of single-qubit Clifford circuits. So, the local n-qubit Clifford subset 402 can comprise all n-qubit Clifford circuits that are tensor products of single-qubit Clifford circuits. Mathematically, this can be represented as:

$$\text{Loc} = \{I, H, P, HP, PH, HPH\}^{\otimes n}$$

where Loc represents the local n-qubit Clifford subset 402. Because the local n-qubit Clifford subset 402 comprises only n-qubit Clifford circuits that are tensor products of single-qubit Clifford circuits, no circuits in the local n-qubit Clifford subset 402 involve a CNOT gate. Thus, all of the circuits in the local n-qubit Clifford subset 402 can be considered as cost-0 Clifford circuits (e.g., they are Clifford circuits that operate on n qubits and that do not include entangling gates).

As mentioned above, the local component 112 can determine, identify, and/or learn the local n-qubit Clifford subset 402 via any suitable technique (e.g., the local component 112 can retrieve and/or look up the local n-qubit Clifford subset 402 in any suitable data structure that is electronically accessible to the local component 112; the local component 112 can generate the local n-qubit Clifford subset 402 based on the qubit quantity 104; the local component 112 can be preprogrammed to know the local n-qubit Clifford subset 402).

Figure 5:
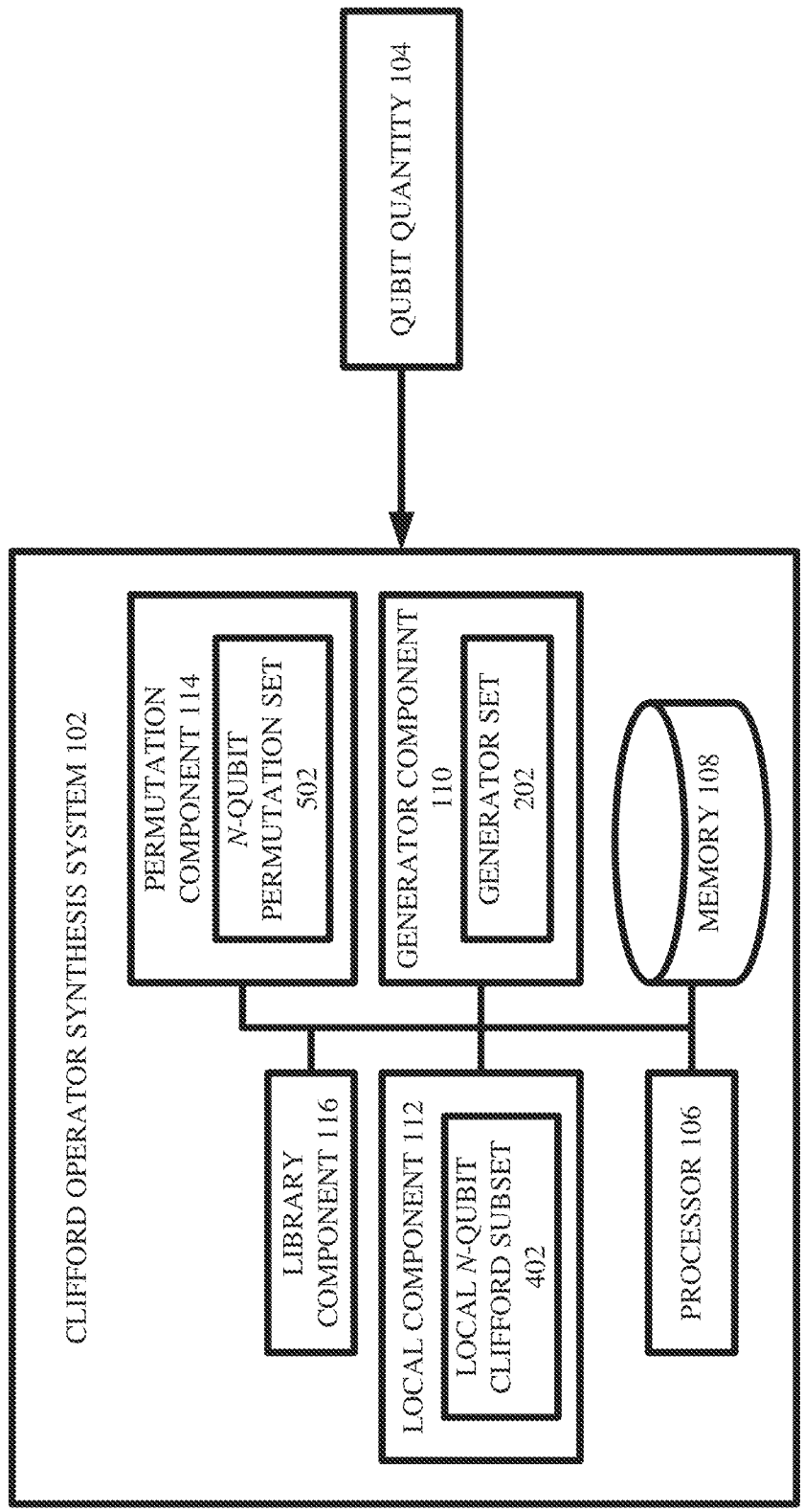
FIG. 5 illustrates a block diagram of an example, non-limiting system including an n-qubit permutation set that facilitates efficient synthesis of optimal multi-qubit Clifford circuits in accordance with one or more embodiments described herein.

FIG. 5 illustrates a block diagram of an example, non-limiting system 500 including an n-qubit permutation set that can facilitate efficient synthesis of optimal multi-qubit Clifford circuits in accordance with one or more embodiments described herein. As shown, the system 500 can, in some cases, comprise the same components as the system 400, and can further comprise the n-qubit permutation set 502.

In various aspects, the permutation component 114 can electronically store and/or maintain in any suitably fashion the n-qubit permutation set 502. In various instances, the n-qubit permutation set 502 can comprise n-qubit permutation circuits that permute and/or swap various qubit values with each other (e.g., that permutate qubits in an n-qubit system).

As mentioned above, the permutation component 114 can determine, identify, and/or learn the n-qubit permutation set 502 via any suitable technique (e.g., the permutation component 114 can retrieve and/or look up the n-qubit permutation set 502 in any suitable data structure that is electronically accessible to the permutation component 114; the permutation component 114 can generate the n-qubit permutation set 502 based on the qubit quantity 104; the permutation component 114 can be preprogrammed to know the n-qubit permutation set 502).

Figure 6:
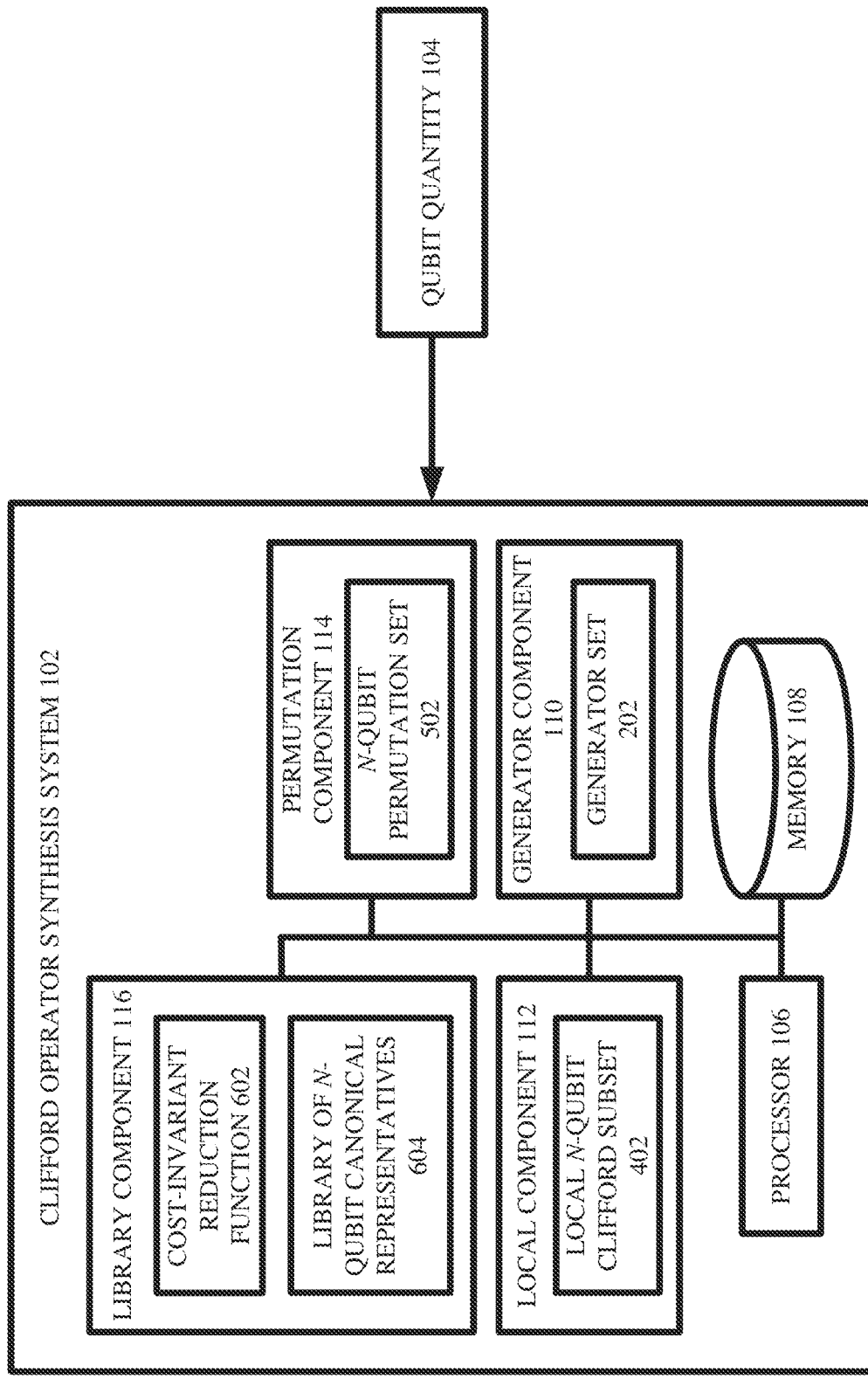
FIG. 6 illustrates a block diagram of an example, non-limiting system including a cost-invariant reduction function and a library of n-qubit canonical representatives that facilitates efficient synthesis of optimal multi-qubit Clifford circuits in accordance with one or more embodiments described herein.

FIG. 6 illustrates a block diagram of an example, non-limiting system 600 including a cost-invariant reduction function and a library of n-qubit canonical representatives that can facilitate efficient synthesis of optimal multi-qubit Clifford circuits in accordance with one or more embodiments described herein. As shown, the system 600 can, in some cases, comprise the same components as the system 500, and can further comprise a cost-invariant reduction function 602.

As mentioned above, the inventors of various embodiments of the invention defined a novel equivalence relation between Clifford circuits. Specifically, an n-qubit Clifford circuit U and an n-qubit Clifford circuit V can be considered equivalent in terms of CNOT-cost (and/or in terms of circuit shape) if:

$$V = WLUL'W^{-1}$$

for some local n-qubit Clifford circuits L and L' (e.g., where L, L'∈Loc) and for some n-qubit permutation W (e.g., where W∈$S_n$, where $S_n$ represents the n-qubit permutation set 502). If U and V satisfy this equivalence relation, U and V can be said to belong to the same cost-invariant equivalence class (e.g., U and V can have the same CNOT-cost and/or circuit shape). Indeed, the CNOT-cost of an n-qubit Clifford circuit can depend only upon its cost-invariant equivalence class.

In various aspects, the cost-invariant reduction function 602 can be a mathematical function that exploits and/or leverages the novel equivalence relation defined above as well as the generator set 202, the local n-qubit Clifford subset 402, and the n-qubit permutation set 502 in order to generate the library of n-qubit canonical representatives 604. Specifically, when given any n-qubit Clifford circuit U, the library component 116 can electronically execute the cost-invariant reduction function 602 on the n-qubit Clifford circuit U, which can leverage the generator set 202, the local n-qubit Clifford subset 402, and the n-qubit permutation set 502 to yield as a result another n-qubit Clifford circuit $U_{reduced}$. In various aspects, the n-qubit Clifford circuit $U_{reduced}$ can be from the same cost-invariant equivalence class as the n-qubit Clifford circuit U (e.g., such that U and $U_{reduced}$ have the same CNOT-cost). Moreover, the cost-invariant reduction function 602 can be configured so as to mathematically guarantee that the n-qubit Clifford circuit $U_{reduced}$ is an optimal n-qubit Clifford circuit from its cost-invariant equivalence class. Specifically, the n-qubit Clifford circuit $U_{reduced}$ can be a lexicographically minimum circuit from the cost-invariant equivalence class containing the n-qubit Clifford circuit U. In various cases, the n-qubit Clifford circuit $U_{reduced}$ can be referred to as a canonical representative of the cost-invariant equivalence class containing the n-qubit Clifford circuit U.

More simply, electronic execution of the cost-invariant reduction function 602 can generate as output an optimal, lexicographically minimum n-qubit Clifford circuit belonging to a particular cost-invariant equivalence class (e.g., so as to synthesize a canonical representative from the particular cost-invariant equivalence class). In various cases, the library component 116 can iteratively execute the cost-invariant reduction function 602 so as to generate an optimal n-qubit Clifford circuit from each cost-invariant equivalence class (e.g., so as to synthesize a canonical representative for every cost-invariant equivalence class). After such iterative execution, the computed optimal, n-qubit Clifford circuits (e.g., one for each cost-invariant equivalence class) can be considered as the library of n-qubit canonical representatives 604.

Figure 7:
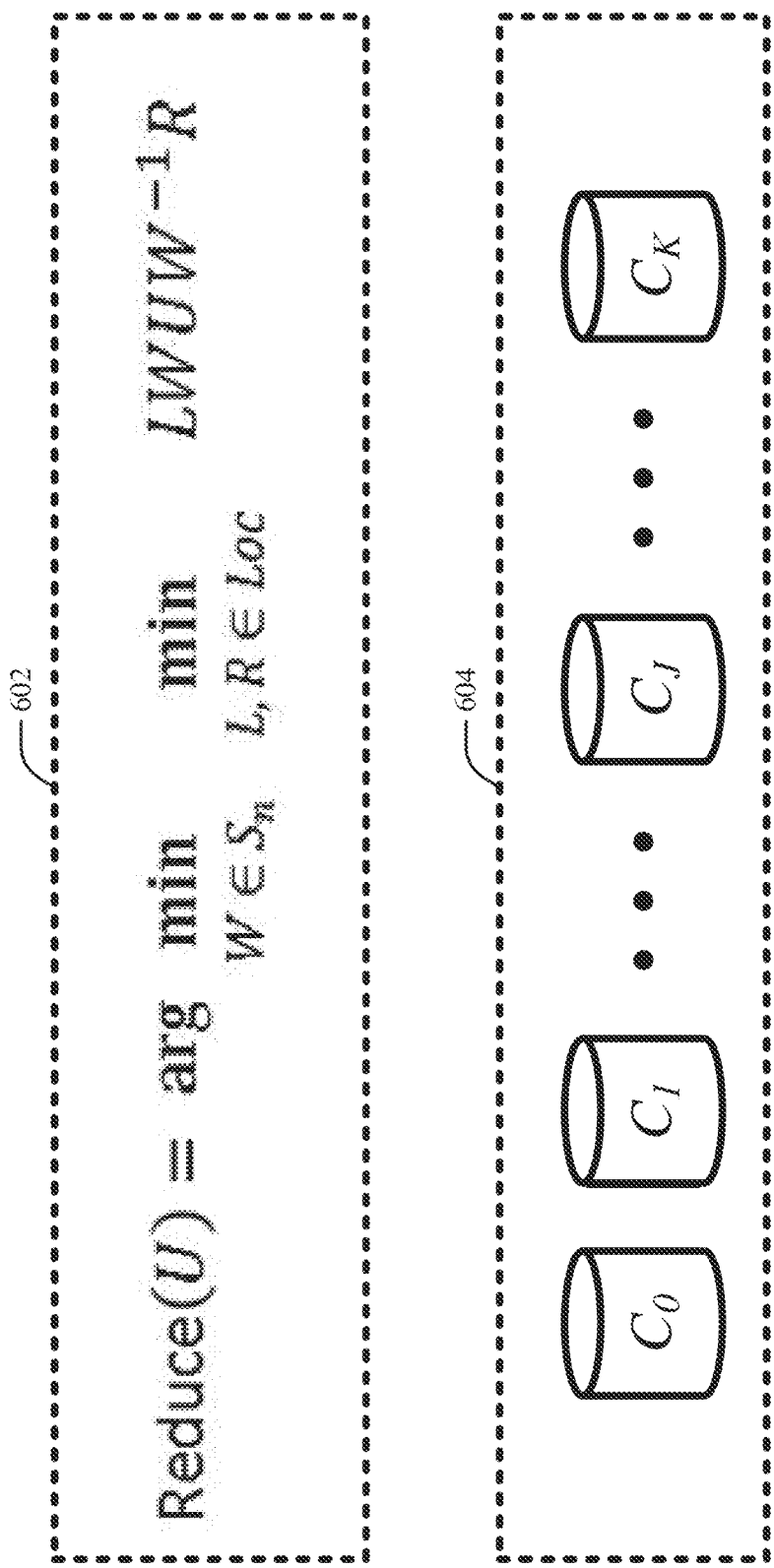
FIG. 7 illustrates an exemplary, non-limiting diagram of a cost-invariant reduction function in accordance with one or more embodiments described herein.

FIG. 7 illustrates an exemplary, non-limiting diagram of a cost-invariant reduction function in accordance with one or more embodiments described herein.

Consider any n-qubit Clifford circuit U. In various aspects, the cost-invariant reduction function 602 can be executed on U in order to generate a canonical representative from the same cost-invariant equivalence class that contains U. As shown, in various embodiments, the cost-invariant reduction function 602 can be given by:

$$\text{Reduce}(U) = \arg\min_{W \in S_n} \min_{L, R \in Loc} LWUW^{-1}R$$

where Reduce(U) represents the canonical representative, where $S_n$ represents the n-qubit permutation set 502, where W represents an n-qubit permutation from $S_n$, where Loc represents the local n-qubit Clifford subset 402, and where L and R represent local n-qubit Clifford circuits from Loc. Some mathematical properties of Reduce(U) include the following: Reduce(U) is equivalent to U (e.g., are in the same cost-invariant equivalence class); and U is equivalent to some n-qubit Clifford circuit V if and only if Reduce(U) =Reduce(V). As explained above, the cost-invariant reduction function 602 computes the lexicographically minimum circuit in the cost-invariant equivalence class that contains U.

In various embodiments, the cost-invariant reduction function 602 can be iteratively executed so as to generate a canonical representative for every and/or for each cost-invariant equivalence class that is relevant to n-qubit Clifford circuits. The resulting set of canonical representatives can be considered as the library of n-qubit canonical representatives 604. In some cases, the library of n-qubit canonical representatives 604 can be collated and/or organized according to CNOT-cost. In various aspects, the CNOT-cost of a particular Clifford circuit can be the smallest number of CNOT gates that are needed to implement the particular Clifford circuit. Any n-qubit Clifford circuit has a maximum CNOT-Cost K that is proportional to $$\frac{n^2}{\log(n)}.$$

Specifically, optimal 2-qubit Clifford circuits have a maximum CNOT-cost of 3, optimal 3-qubit Clifford circuits have a maximum CNOT-cost of 6, optimal 4-qubit Clifford circuits have a maximum CNOT-cost of 9, optimal 5-qubit Clifford circuits have a maximum CNOT-cost of 12, optimal 6-qubit Clifford circuits have a maximum CNOT-cost of 15, and so on. In various cases, each CNOT-cost can be associated with one or more cost-invariant equivalence classes. Accordingly, as shown in FIG. 7, the library of n-qubit canonical representatives 604 can, in various embodiments, be collated and/or organized according to CNOT-cost. Specifically, the library of n-qubit canonical representatives 604 can comprise a dataset $C_0$ that contains n-qubit canonical representatives having a CNOT-cost of 0, a dataset $C_1$ that contains n-qubit canonical representatives having a CNOT-cost of 1, a dataset $C_j$ that contains n-qubit canonical representatives having a CNOT-cost of j for any suitable positive integer j, and so on, culminating with a dataset $C_K$ that contains n-qubit canonical representatives having a CNOT-cost of K (e.g., where K is proportional to $$\left.\frac{n^2}{\log(n)}\right).$$

Thus, the library of n-qubit canonical representatives 604 can be considered as the union of $C_0, C_1, \ldots, C_j, \ldots,$ and $C_K$. In various aspects, the number of canonical representatives stored in each dataset can depend on the number of equivalence classes that are associated with a given CNOT-cost (e.g., if m equivalence classes exist for a CNOT-cost of j, then the dataset $C_j$ can contain m canonical representatives, one for each equivalence class).

FIG. 8 illustrates an exemplary, non-limiting computer-implemented algorithm 800 that can facilitate efficient synthesis of optimal multi-qubit Clifford circuits via a cost-invariant reduction function in accordance with one or more embodiments described herein. In other words, the algorithm 800 can be an exemplary and non-limiting way in which the library component 116 can utilize the cost-invariant reduction function 602, the generator set 202, the local n-qubit Clifford subset 402, and the n-qubit permutation set 502 to generate the library of n-qubit canonical representatives 604.

In various aspects, all of the individual datasets in the library of n-qubit canonical representatives 604 can be initially empty (e.g., $C_0$ can be empty, $C_1$ can be empty, ..., $C_K$ can be empty). As shown, the algorithm 800 can begin by initializing the dataset $C_0$ with a canonical-representative from the local n-qubit Clifford subset 402 (e.g., with a canonical representative from Loc). Specifically, the n-qubit identity circuit I can be a member of the local n-qubit Clifford subset 402, and so the library component 116 can apply the cost-invariant reduction function 602 to the n-qubit identity circuit I, and the resulting canonical representative can be inserted into the dataset $C_0$.

In various aspects, a first for-loop can be implemented over index j from 1 to infinity. In this first for-loop, the library component 116 can initialize the dataset $C_j$ as the null set (e.g., can make $C_j$ empty initially, as mentioned above).

In various instances, the library component 116 can then initiate a second for-loop nested within the first for-loop. This second for-loop can iterate through every n-qubit Clifford circuit U that is an element of the dataset $C_{j-1}$.

In various cases, the library component 116 can then initiate a third for-loop nested within the second for-loop. This third for-loop can iterate through every generator circuit V that is an element of the generator set 202 (e.g., in FIG. 8, Gen can represent the generator set 202). For every generator circuit V in the generator set 202, the library component 116 can multiply U and V together, and can execute the cost-invariant reduction function 602 on the product of U and V. The resulting canonical representative is denoted as W in FIG. 8 (e.g., W is assigned the resulting circuit that is yielded by Reduce (U*V)).

In various aspects, the library component 116 can then determine whether the canonical representative W is already an element of the dataset $C_{j-1}$ or the dataset $C_{j-2}$ (e.g., note that, in various cases, the dataset $C_r$ can be considered the null set for any r<0). If W is in neither of $C_{j-1}$ or in $C_{j-2}$, the library component 116 can insert W into the dataset $C_j$ (e.g., $C_j$ can be assigned all its previous elements and the new element W).

In various instances, once the second for-loop has iterated for every n-qubit Clifford circuit U that is an element of the dataset $C_{j-1}$, the library component 116 can determine whether or not the dataset $C_j$ is empty. If $C_j$ is empty, the algorithm 800 can end (e.g., break). If $C_j$ is not empty, the first for-loop can progress to the next index j.

In various aspects, electronic execution of the algorithm 800 by the library component 116 can result in the electronic generation/synthesis of the library of n-qubit canonical representatives 604. It should be appreciated that the algorithm 800 is exemplary and non-limiting.

FIG. 9 illustrates exemplary, non-limiting Clifford group element counts and equivalence class counts in accordance with one or more embodiments described herein. In other words, FIG. 9 depicts a table 900 that demonstrates how various embodiments of the invention can ameliorate the intractability problem for n=6.

As mentioned above, the maximum cost of an optimal 6-qubit Clifford circuit is 15 (e.g., 15 CNOT gates). As shown, the table 900 lists the number of possible optimal 6-qubit Clifford operators for each CNOT-cost, and lists the number of cost-invariant equivalence classes for each CNOT-cost. Specifically, table 900 shows that there are 46,656 different optimal 6-qubit Clifford operators having a CNOT cost of 0, and table 900 also shows that there is only 1 cost-invariant equivalence class of 6-qubit Clifford operators having a CNOT cost of 0. When building a library/database of optimal 6-qubit Clifford operators, conventional systems/techniques would attempt to compute and store every single one of the 46,656 possible optimal 6-qubit Clifford operators having a cost of 0. In stark contrast, various embodiments of the invention can represent that entire set of 46,656 optimal 6-qubit Clifford operators having a cost of 0 with a single canonical representative computed by the cost-invariant reduction function 602. Similarly, table 900 shows that there are 6,298,560 different optimal 6-qubit Clifford operators having a CNOT cost of 1, and table 900 also shows that there is only 1 cost-invariant equivalence class of 6-qubit Clifford operators having a CNOT cost of 1. Thus, while conventional systems/techniques would attempt to compute and store every single one of the 6,298,560 possible optimal 6-qubit Clifford operators having a cost of 1, various embodiments of the invention can represent that entire set of 6,298,560 optimal 6-qubit Clifford operators having a cost of 1 with a single canonical representative computed by the cost-invariant reduction function 602. Likewise, table 900 shows that there are 554,273,280 different optimal 6-qubit Clifford operators having a CNOT cost of 2, and table 900 also shows that there are only 4 cost-invariant equivalence classes of 6-qubit Clifford operators having a CNOT cost of 2. Thus, while conventional systems/techniques would attempt to compute and store every single one of the 554,273,280 possible optimal 6-qubit Clifford operators having a cost of 2, various embodiments of the invention can represent that entire set of 554,273,280 optimal 6-qubit Clifford operators having a cost of 2 with merely four canonical representatives computed by the cost-invariant reduction function 602. Further still, table 900 shows that there are over 39 billion different optimal 6-qubit Clifford operators having a CNOT cost of 3, and table 900 also shows that there are only 23 cost-invariant equivalence classes of 6-qubit Clifford operators having a CNOT cost of 3. Thus, while conventional systems/techniques would attempt to compute and store every single one of the over 39 billion possible optimal 6-qubit Clifford operators having a cost of 3, various embodiments of the invention can represent that entire set of more than 39 billion optimal 6-qubit Clifford operators having a cost of 3 with merely twenty-three canonical representatives computed by the cost-invariant reduction function 602. And so on.

As shown at the bottom of the table 900, the overall number of optimal 6-qubit Clifford operators totals more than $2*10^{23}$, whereas the overall number of equivalence classes for 6-qubit Clifford operators totals about $1.4*10^{11}$. In other words, there are about twelve orders of magnitude fewer equivalence classes of optimal 6-qubit Clifford operators than there are optimal 6-qubit Clifford operators. This twelve-order-of-magnitude reduction can significantly help ameliorate the intractability problem. That is, conventional Clifford synthesizers/compilers attempt to compute every single one of the more than $2*10^{23}$ different optimal 6-qubit Clifford operators, and such conventional Clifford synthesizers/compilers cannot successfully complete such task due to the sheer size of $2*10^{23}$. Various embodiments of the invention, on the other hand, can represent the entire set of $2*10^{23}$ different optimal 6-qubit Clifford operators by merely $1.4*10^{11}$ canonical representatives. Thus, various embodiments of the invention need only compute and store one canonical representative for each equivalence class, which means that various embodiments of the invention can compute and store twelve orders of magnitude fewer operators (e.g., subsets of optimal Clifford circuits that leave the CNOT-cost invariant are factored out). In this way, the intractability problem can be ameliorated.

It should be appreciated that the table 900 depicts results/counts only for n=6. In various aspects, similar reductions between the number of optimal n-qubit Clifford circuits and the number of equivalence classes of n-qubit Clifford circuits occur for any other suitable values of n.

Figure 10:
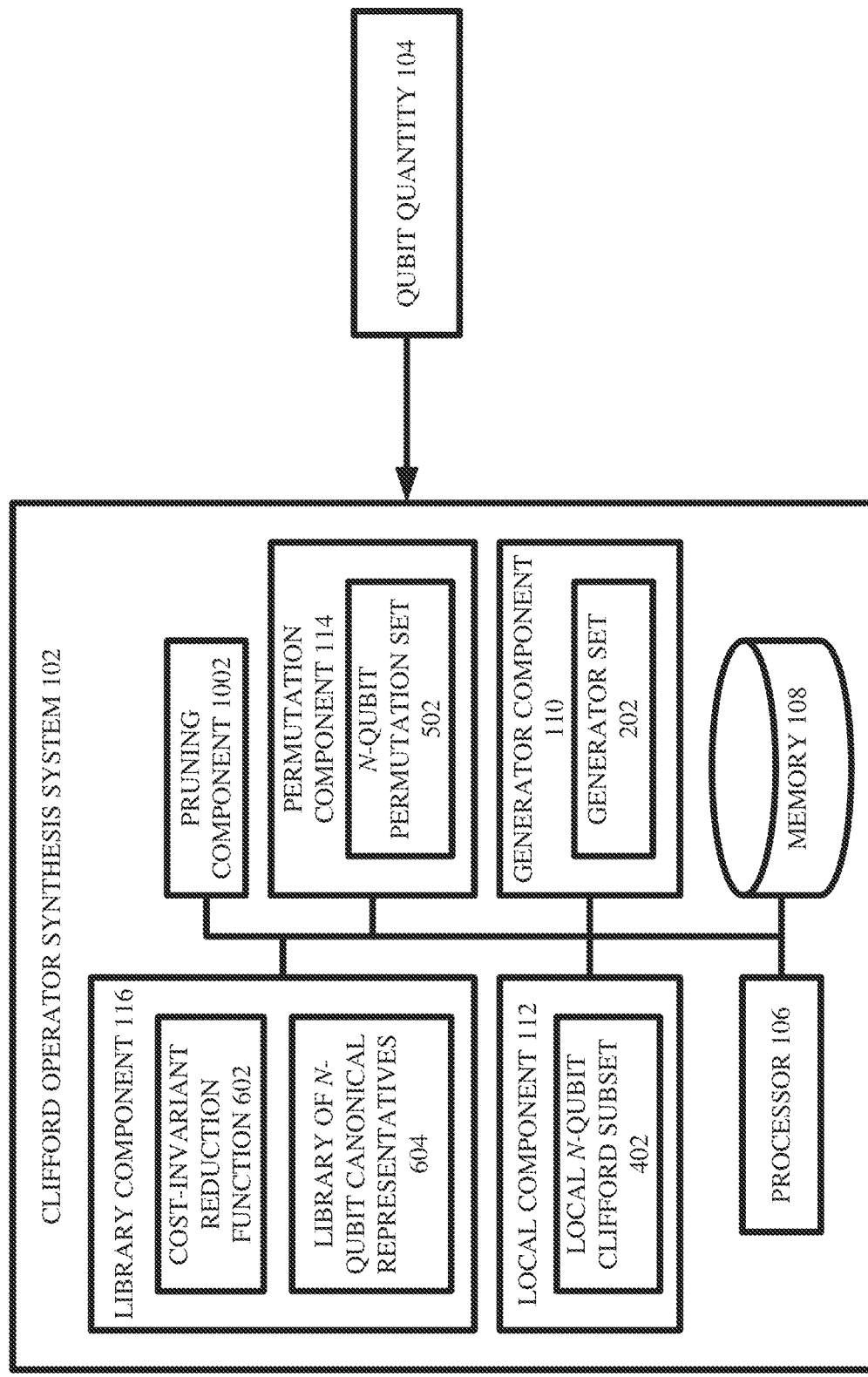
FIG. 10 illustrates a block diagram of an example, non-limiting system including a pruning component that facilitates efficient synthesis of optimal multi-qubit Clifford circuits in accordance with one or more embodiments described herein.

FIG. 10 illustrates a block diagram of an example, non-limiting system 1000 including a pruning component that can facilitate efficient synthesis of optimal multi-qubit Clifford circuits in accordance with one or more embodiments described herein. As shown, the system 1000 can, in some cases, comprise the same components as the system 600, and can further comprise a pruning component 1002.

In various aspects, it can be computationally expensive to compute canonical representatives. Indeed, a brute-force execution of the cost-invariant reduction function 602 as depicted in FIG. 7 can require searching through $|Loc|^2*|S_n|=6^{2n}*n!$ different elements. In order to speed this process up, the pruning component 1002 can prune the search space (e.g., can prune the local n-qubit Clifford subset 402 and the n-qubit permutation set 502) using a subgroup-adapted order. In various cases, such a subgroup-adapted order can prioritize qubit permutations over local Clifford circuits, and can prioritize left multiplications by local Clifford circuits over right multiplications by local Clifford circuits. In some cases, a divide-and-conquer strategy can be implemented.

Specifically, the pruning component 1002 can define functions $f_1(U)$ and $f_2(U)$ that map any suitable n-qubit Clifford operator U to integers with the following properties:

$f_1(LUR)=f_1(U)$ for all $L, R \in Loc$ $f_2(UR)=f_2(U)$ for all $R \in Loc$

Accordingly, the n-qubit permutation set 502 and/or the local n-qubit Clifford subset 402 can be pruned for each n-qubit Clifford circuit U on which the cost-invariant reduction function 602 is executed. In particular, the pruning can be expressed by:

$$S'_n(U) = \arg\min_{W \in S_n} f_1(WUW^{-1})$$

$$Loc'(U, W) = \arg\min_{L \in Loc} f_2(LWUW^{-1})$$

where $S'_n$ represents the pruned version of the n-qubit permutation set 502 for a given n-qubit Clifford circuit U, W represents an n-qubit permutation from the n-qubit permutation set 502 (e.g., an element of $S_n$), Loc' represents the pruned version of the local n-qubit Clifford subset 402 for the given n-qubit Clifford circuit U and for W, and L is a local n-qubit Clifford circuit from the local n-qubit Clifford subset 402 (e.g., an element of Loc).

In various embodiments, the function $f_1(U)$ can be defined as a rank matrix $r_{i,j}$ represented by an integer using the lexicographic order on the set of binary matrices. This is non-limitingly illustrated in FIG. 11. Specifically, any suitable n-qubit Clifford circuit U can be represented and/or expressed in terms of a stabilizer tableaux, which can be a binary matrix of size $(2n) \times (2n)$ (e.g., shown by numeral 1102 in FIG. 11). Based on this stabilizer tableaux, the function $f_1(U)$ can be defined as generating ranks of corresponding portions of the stabilizer tableaux (e.g., shown by numeral 1104 in FIG. 11). In other words, the element $r_{i,j}$ of $f_1(U)$, for any suitable indices i and j, is equal to the rank of $$\begin{bmatrix} a_{i,j} & b_{i,j} \\ c_{i,j} & d_{i,j} \end{bmatrix},$$

which is the portion of the stabilizer tableaux of U that corresponds to the element $r_{i,j}$ of $f_1(U)$. In various aspects, such ranks can be invariant under left and/or right multiplications by local Clifford operators.

In various embodiments, the function $f_2(U)$ can be defined as follows. Let supp(Π) be the support of a Pauli operator $\Pi \in \{I, X, Y, Z\}^n$, that is, the subset of qubits that are acted upon by X or Y or Z. Next, represent supp(Π) by an n-bit string such that the i-th bit is 1 if and only if $i \in supp(\Pi)$. Then, the function $f_2(U)$ for any suitable n-qubit Clifford circuit U can be given as:

$$f_2(U)=[supp(U^{-1}X_1U), \ldots ,supp(U^{-1}X_nU), supp(U^{-1}Z_1U), \ldots ,supp(U^{-1}Z_nU)]$$

where $X_j = I \otimes I \otimes \ldots \otimes I \otimes X \otimes I \otimes \ldots \otimes I$ is an n-qubit tensor product of n−1 identity matrices and one Pauli-X matrix operating on the j-th qubit, and where $Z_j = I \otimes I \otimes \ldots \otimes I \otimes Z \otimes I \otimes \ldots \otimes I$ is an n-qubit tensor product of n−1 identity matrices and one Pauli-Z matrix operating on the j-th qubit. In other words, the function $f_2(U)$ can be defined as the concatenation of all support strings represented by an integer using the lexicographic order on the set of bit strings. In some cases, the supports $supp(U^{-1}X_iU)$ and $supp(U^{-1}Z_iU)$ can be invariant under right multiplication of U by local Clifford operators.

Based on this pruning, the pruning component 1002 can, in various aspects, convert the cost-invariant reduction function 602 to the pruned cost-invariant reduction function 1004.

Figure 12:
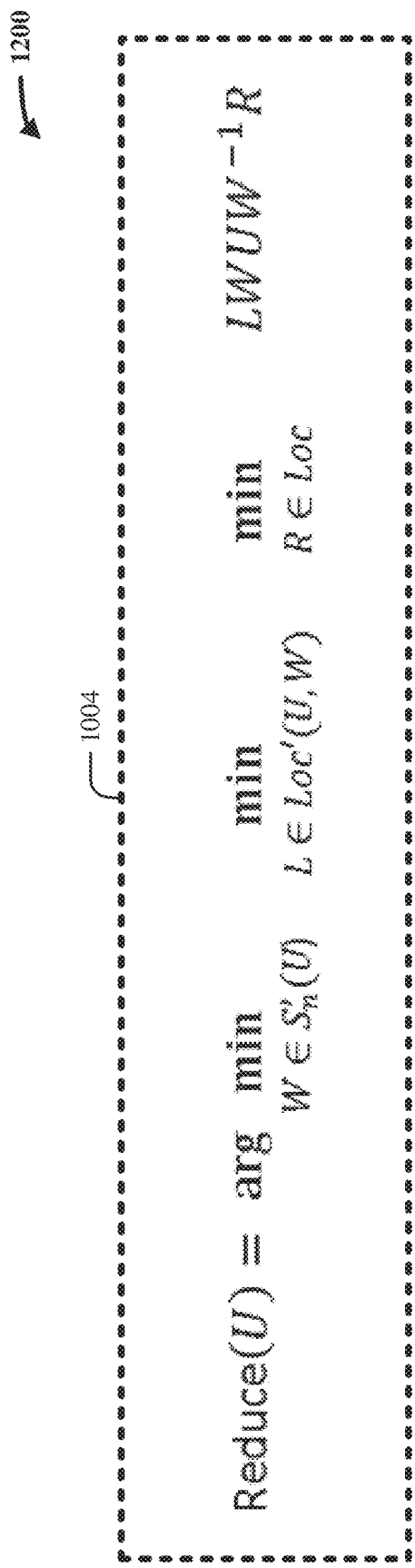
FIG. 12 illustrates an exemplary, non-limiting diagram of a pruned cost-invariant reduction function and associated computation times in accordance with one or more embodiments described herein.

FIG. 12 illustrates an exemplary, non-limiting diagram of a pruned cost-invariant reduction function and associated computation times in accordance with one or more embodiments described herein. That is, FIG. 12 depicts an exemplary, non-limiting embodiment of the pruned cost-invariant reduction function 1004.

Suppose that there is an n-qubit Clifford circuit U. In various aspects, the pruned cost-invariant reduction function 1004 can be executed on U in order to generate a canonical representative from the same cost-invariant equivalence class that contains U, and such execution can be more quickly/efficiently performed than can be the execution of the cost-invariant reduction function 602. As shown, in various embodiments, the pruned cost-invariant reduction function 1004 can be given by:

$$\text{Reduce}(U) = \arg\min_{W \in S'_n(U)} \min_{L, R \in \text{Loc}'(U,W)} LWUW^{-1}R$$

where Reduce(U) represents the canonical representative, where $S'_n(U)$ represents the pruned version of the n-qubit permutation set 502 based on U, where W represents an n-qubit permutation from $S'_n(U)$ where Loc'(U, W) represents the pruned version of the local n-qubit Clifford subset 402 based on U and W, where L represents a local n-qubit Clifford circuit from Loc'(U,W), and R represents a local n-qubit Clifford circuit from Loc.

In various aspects, the table 1202 lists some computation times associated with the pruned cost-invariant reduction function 1004. As shown, the library component 116 can, in various aspects, execute the pruned cost-invariant reduction function 1004 on 2-qubit Clifford circuits in about $6*10^{-7}$ seconds. Similarly, the library component 116 can, in various instances, execute the pruned cost-invariant reduction function 1004 on 3-qubit, 4-qubit, or 5-qubit Clifford circuits in about $2*10^{-6}$ seconds. Lastly, the library component 116 can, in various cases, execute the pruned cost-invariant reduction function 1004 on 6-qubit Clifford circuits in about $6*10^{-6}$ seconds. These performance metrics were obtained by the inventors of various embodiments of the invention by using an Intel Core i7-10700K processor. Therefore, the pruned cost-invariant reduction function 1004 can be significantly computationally efficient.

FIG. 13 illustrates exemplary, non-limiting results in accordance with one or more embodiments described herein.

As shown, the table 1302 lists the number of cost-invariant equivalence classes organized according to number of qubits (e.g., n) and according to CNOT-cost. As shown, for 2-qubit Clifford circuits, there are a total of 4 equivalence classes (e.g., one equivalence class having a CNOT-cost of 0, one equivalence class having a CNOT-cost of 1, one equivalence class having a CNOT-cost of 2, and one equivalence class having a CNOT-cost of 3). Thus, a library of 2-qubit canonical representatives can contain four canonical representatives. For 3-qubit Clifford circuits, there are a total of 27 equivalence classes (e.g., one equivalence class having a CNOT-cost of 0, one equivalence class having a CNOT-cost of 1, three equivalence classes having a CNOT-cost of 2, eight equivalence classes having a CNOT-cost of 3, ten equivalence classes having a CNOT-cost of 4, three equivalence classes having a CNOT-cost of 5, and one equivalence class having a CNOT-cost of 6). Thus, a library of 3-qubit canonical representatives can contain 27 canonical representatives. As shown, for 4-qubit Clifford circuits, there are a total of 2,363 equivalence classes, and so a library of 4-qubit canonical representatives can contain 2,363 canonical representatives. And so on.

As shown, the table 1304 lists various computation times and storage spaces associated with libraries of multi-qubit canonical representatives. Specifically, various embodiments of the invention can generate a library of 2-qubit canonical representatives in 0.0007 seconds, and such library can take up 0.000064 Megabytes (MB) of computer memory. Various embodiments of the invention can generate a library of 3-qubit canonical representatives in 0.003 seconds, and such library can take up 0.00043 MB of computer memory. Various embodiments of the invention can generate a library of 4-qubit canonical representatives in 0.25 seconds, and such library can take up 0.04 MB of computer memory. Various embodiments of the invention can generate a library of 5-qubit canonical representatives in 1,018 seconds, and such library can take up 70 MB of computer memory. Various embodiments of the invention can generate a library of 6-qubit canonical representatives in the order of 15 million seconds, and such library can take up on the order of 3 million MB of computer memory.

Importantly, such performance metrics far exceed corresponding performance metrics of conventional Clifford synthesizers and/or compilers. Specifically, conventional Clifford synthesizers and/or compilers can, at best, only function for up to n=4. However, they require on the order of 5,000 seconds to do so, and the resulting library takes up about 290 MB of computer memory. As shown in the table 1304, various embodiments of the invention can generate a library of 4-qubit canonical representatives in about 0.25 seconds that takes up about 0.04 MB of computer memory. This means that various embodiments of the invention can generate a library of optimal 4-qubit Clifford circuits 20,000 times faster and can be 7,250 times more space-efficient than conventional Clifford synthesizers and/or compilers. Moreover, as mentioned several times above, conventional Clifford synthesizers and/or compilers simply cannot function for n>4, whereas various embodiments of the invention can. Certainly, various embodiments of the invention thus constitute a real, concrete, and tangible technical improvement in the field of quantum computation.

In some cases, an amount of storage space consumed by embodiments of the invention can be reduced by an additional factor of almost 2 by keeping the smaller of Reduce (U) and Reduce ($U^{-1}$) for any given n-qubit Clifford circuit U.

Not only did the inventors of various embodiments of the invention devise techniques that can ameliorate and/or combat the intractability problem that plagues Clifford circuit synthesis, but they also devised a novel data structure for representing n-qubit Clifford circuits in binary format. In various aspects, this novel data structure and/or format can be referred to as thin matrix representation and/or thin matrix binary format.

In various aspects, Pauli operators can be represented by bit strings and/or reverse bit strings, as shown below:

$$I = \begin{bmatrix} 1 & 0 \\ 0 & 1 \end{bmatrix} = \prod(00); \quad X = \begin{bmatrix} 0 & 1 \\ 1 & 0 \end{bmatrix} = \prod(10);$$

$$Z = \begin{bmatrix} 1 & 0 \\ 0 & -1 \end{bmatrix} = \prod(01); \quad Y = \begin{bmatrix} 0 & -i \\ i & 0 \end{bmatrix} = \prod(11)$$

That is, I can be represented by the reverse bit string 00, which can be equivalent to the integer 0 (e.g., $0*2^0 + 0*2^1 = 0$); X can be represented by the reverse bit string 10, which can be equivalent to the integer 1 (e.g., $1*2^0 + 0*2^1 = 1$); Z can be represented by the reverse bit string 01, which can be equivalent to the integer 2 (e.g., $0*2^0 + 1*2^1 = 2$); and Y can be represented by the reverse bit string 11, which can be equivalent to the integer 3 (e.g., $1*2^0 + 1*2^1 = 3$). For n-qubit Pauli operators, this can be expressed in general as follows:

$$\Pi(v) = \Pi(v_0 v_1) \otimes \Pi(v_2 v_3) \otimes \ldots \otimes \Pi(v_{2n-2} v_{2n-1})$$

for any suitable positive integer n, and where $v \in \{0,1\}^{2n}$. In other words, an n-qubit Pauli operator can be represented by a reverse bit string (and/or an ordinary bit string, in various cases) having 2n bits (e.g., v can have 2n bits as shown above). In various aspects, this notation can ignore phase factors such as −1, i, and/or −i. For example, the 8-qubit Pauli given by $X \otimes Z \otimes Y$ can be represented as the binary integer 57 because:

$$X \otimes Z \otimes Y = \Pi(10) \otimes \Pi(01) \otimes \Pi(11) = \Pi(100111)$$

and because $1*2^0+0*2^1+0*2^2+1*2^3+1*2^4+1*2^5=57$.

As mentioned above, it can be said that $X_j = I \otimes I \otimes \ldots \otimes I \otimes X \otimes I \otimes \ldots \otimes I$ is an n-qubit tensor product of n−1 identity matrices and one Pauli-X matrix operating on the j-th qubit, that $Z_j = I \otimes I \otimes \ldots \otimes I \otimes Z \otimes I \otimes \ldots \otimes I$ is an n-qubit tensor product of n−1 identity matrices and one Pauli-Z matrix operating on the j-th qubit, and that $Y_j = I \otimes I \otimes \ldots \otimes I \otimes Z \otimes I \otimes \ldots \otimes I$ is an n-qubit tensor product of n−1 identity matrices and one Pauli-Y matrix operating on the j-th qubit.

Because Clifford circuits map Pauli operators to other Pauli operators (e.g., up to a phase), a Clifford circuit can be electronically stored and/or represented by a set of bit strings (e.g., and/or a set of reverse bit strings) that indicate how the Clifford circuit maps one or more known Pauli operators (e.g., the $X_j$, $Z_j$, and $Y_j$ above) to one or more other known Pauli operators. That is, for any n-qubit Clifford circuit U, the following holds:

$$U^{-1}X_jU=\Pi(a^j); U^{-1}Z_jU=\Pi(b^j); U^{-1}Y_jU=\Pi(a^j \oplus b^j)$$

for some bit strings $a=(a^0, a^1, \ldots, a^{n-1})$ and $b=(b^0, b^1, \ldots, b^{n-1})$, where $a^j, b^j \in \{0,1\}^{2n}$, and where $\oplus$ represents addition modulo 2. As an example of such notation, consider the operation of U on the tensor product $X \otimes Z \otimes Y$, which yields:

$$U^{-1}X \otimes Z \otimes YU = U^{-1}X_0 U * U^{-1}Z_1 U * U^{-1}Y_2 U = \Pi(a^0 \oplus b^1 \oplus a^2 \oplus b^2)$$

In other words, U can be electronically stored, maintained, represented, and/or applied in computations by storing, maintaining, representing, and/or applying the bit strings a and b Note that the bit strings a and b fully specify the n-qubit Clifford circuit U up to a phase. Therefore, in various aspects, it can be desirable to represent and/or electronically store/maintain the bit strings a and b as two 64-bit (and/or smaller) binary integers, so that bitwise operations can be performed on them. However, note that the bit strings a and b are both $2n^2$ bits in length. So, for n=6 (e.g., for 6-qubit Clifford circuits), a and b would each have a length of 72 bits. Thus, under conventional techniques, the bit strings a and b cannot each be represented by a 64-bit (and/or smaller) binary integer. In various aspects, however, the inventors of various embodiments of the invention devised a data structure and/or technique known as thin matrix representation and/or thin matrix binary format which can allow the bit strings a and b to each be represented by a 60-bit binary integer (e.g., the two resulting 60-bit binary integers can together be considered as a thin matrix and/or a reduced tableaux).

Specifically, in various embodiments, the first 2n(n−1) bits of the bit string a can be stored/maintained (e.g., $a^0, a^1, a^{n-2}$ can be kept/recorded) and the last 2n bits of a can be omitted (e.g., $a^{n-1}$ can be left out and/or missing). Similarly, in various instances, the first 2n(n−1) bits of b can be stored/maintained (e.g., $b^0, b^1, b^{n-2}$ can be kept/recorded) and the last 2n bits of b can be omitted (e.g., $b^{n-1}$ can be left out and/or missing). In other words, a first 60-bit binary integer can store, maintain, and/or represent the first 2n(n−1) bits of the bit string a, such that $a_{thin}=(a^0, a^1, \ldots, a^{n-2})$, where $a_{thin}$ denotes the first 60-bit binary integer. Likewise, a second 60-bit binary integer can store, maintain, and/or represent the first 2n(n−1) bits of the bit string b, such that $b_{thin}=(b^0, b^1, \ldots, b^{n-2})$, where $b_{thin}$ denotes the second 60-bit binary integer. In some cases, $a_{thin}$ and $b_{thin}$ can together be considered as a thin matrix (e.g., they can together form a 2×60 matrix, and the term "thin" can be used since certain data has been omitted, as explained above).

In various instances, the missing data (e.g., $a^{n-1}$ and $b^{n-1}$) can be efficiently extracted from the thin matrix representation (e.g., from the first 60-bit binary integer $a_{thin}$ and from the second 60-bit binary integer $b_{thin}$) by using/exploiting Gram-Schmidt orthogonalization.

In various embodiments, the first 60-bit binary integer $a_{thin}$ and the second 60-bit binary integer $b_{thin}$ can be represented across two machine words in order to electronically store a canonical representative. Specifically, in various cases, $a_{thin}$ and $b_{thin}$ can together take up 120 bits of space, and so they can be represented by two 64-bit binary integers (e.g., two machine words) where the final 8 bits are unused. In some instances, these final 8 bits can be loaded with information corresponding to a last gate in an optimal circuit. This can help to reduce the search for an optimal Clifford circuit by a large factor (e.g., by a factor of about 67.5) as compared to techniques that do not store such last-gate information. Using a high-performance server, the average time to extract an optimal 6-qubit Clifford circuit can be about 0.001099 seconds with this approach.

In various embodiments, an n-qubit canonical representative, as described herein, can be considered as an individual n-qubit Clifford unitary (e.g., an n-qubit Clifford circuit and/or an n-qubit Clifford operator) that is electronically stored in a thin matrix binary format, where the thin matrix binary format can be derived from the tableaux of the n-qubit Clifford unitary as described above.

FIG. 14 illustrates an exemplary, non-limiting computer-implemented algorithm 1400 that can facilitate thin matrix representation of Clifford circuits in accordance with one or more embodiments described herein. In other words, FIG. 14 shows an exemplary and non-limiting way in which Gram-Schmidt orthogonalization can be used to extract $a^{n-1}$ and $b^{n-1}$ from $a_{thin}$ and $b_{thin}$. For ease of illustration and comprehension, the algorithm 1400 is demarcated as having six exemplary and non-limiting steps.

As shown, execution of steps 1-3 can generate $a^{n-1}$, and execution of steps 4-6 can generate $b^{n-1}$. As shown, step 1 can include initializing $a^{n-1}$ as a random bit string of length 2n. Step 2 can involve iterating through a for-loop over an index j from 0 to n−2. For each iteration, the inner product of $a^{n-1}$ and $a^j$ can be computed. Note that the inner product function can be defined as follows:

$$\text{InnerProduct}(v,w) = \Sigma_{i=0}^{n-1} v_{2i} w_{2i+1} + v_{2i+1} w_{2i} \pmod{2}$$

for any suitable bit strings v and w of length 2n. If the inner product of $a^{n-1}$ and $a^j$ is equal to 1, then the current value of $a^{n-1}$ can be updated by adding to it (modulo 2) the value of $b^j$. Next, in various aspects, the inner product of $a^{n-1}$ and $b^j$ can be computed. If the inner product of $a^{n-1}$ and $b^j$ is equal to 1, then the current value of $a^{n-1}$ can be updated by adding to it (modulo 2) the value of $a^j$. In various cases, step 3 can involve checking whether the current value of $a^{n-1}$ is equal to 0. If so, the algorithm 1400 can proceed back to step 1. If not, the value of $a^{n-1}$ has been obtained, and the algorithm 1400 can proceed to step 4. Note that the probability of success is 50% per repetition, and so a few iterations through steps 1-3 can occur.

In various cases, step 4 can include initializing $b^{n-1}$ as a random bit string of length 2n. Step 5 can involve computing the inner product of $a^{n-1}$ and $b^{n-1}$. If the inner product of $a^{n-1}$ and $b^{n-1}$ is equal to 0, the algorithm 1400 can go back to step 4. If not, the algorithm 1400 can proceed to step 6. As shown, step 6 can involve iterating through a for-loop over an index j from 0 to n−2. For each iteration, the inner product of $b^{n-1}$ and $a^j$ can be computed. If the inner product of $b^{n-1}$ and $a^j$ is equal to 1, then the current value of $b^{n-1}$ can be updated by adding to it (modulo 2) the value of $b^j$. Next, in various aspects, the inner product of $b^{n-1}$ and $b^j$ can be computed. If the inner product of $b^{n-1}$ and $b^j$ is equal to 1, then the current value of $b^{n-1}$ can be updated by adding to it (modulo 2) the value of $a^j$. Thus, the value of $b^{n-1}$ has been obtained.

In various aspects, the algorithm 1400 can be considered as reconstructing the full Clifford operator U from the thin matrix representation (e.g., from $a_{thin}$ and $b_{thin}$) modulo left multiplications with single-qubit Clifford circuits on the (n−1)-th qubit. Such multiplications do not change the CNOT-cost and can thus be ignored.

Figure 15:
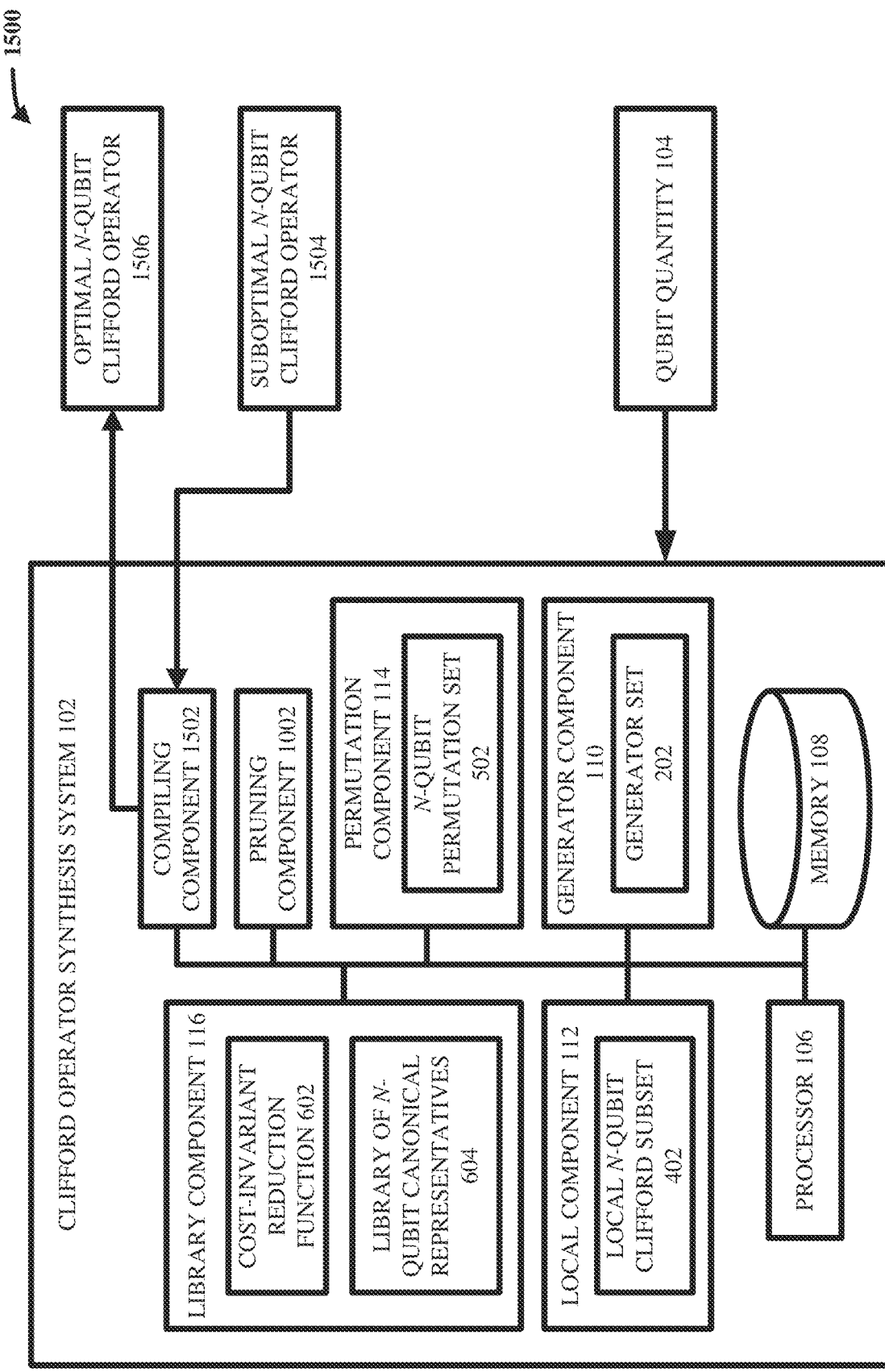
FIG. 15 illustrates a block diagram of an example, non-limiting system including a compiling component that facilitates efficient synthesis of optimal multi-qubit Clifford circuits in accordance with one or more embodiments described herein.

FIG. 15 illustrates a block diagram of an example, non-limiting system 1500 including a compiling component that can facilitate efficient synthesis of optimal multi-qubit Clifford circuits in accordance with one or more embodiments described herein. As shown, the system 1500 can, in some cases, comprise the same components as the system 1000, and can further comprise the compiling component 1502.

In various embodiments, the compiling component 1502 can receive as input (e.g., from any suitable electronic and/or interfacing source) a suboptimal n-qubit Clifford operator 1504 and can leverage the library of n-qubit canonical representatives 604 to determine and/or identify an optimal n-qubit Clifford operator 1506 that implements the suboptimal n-qubit Clifford operator 1504. In various aspects, the optimal n-qubit Clifford operator 1506 can have a lower CNOT-cost as compared to the suboptimal n-qubit Clifford operator 1504, but can nonetheless perform an overall same circuit transformation as the suboptimal n-qubit Clifford operator 1504 (e.g., the optimal n-qubit Clifford operator 1506 can implement the suboptimal n-qubit Clifford operator 1504 using fewer CNOT gates). In other words, much of the above discussion explains how the Clifford operator synthesis system 102 can generate/synthesize the library of n-qubit canonical representatives 604, and the compiling component 1502 can apply the library of n-qubit canonical representatives 604 to optimize given Clifford circuits.

Specifically, a given suboptimal n-qubit Clifford circuit U (e.g., U can be considered as the suboptimal n-qubit Clifford operator 1504) can be expressed as:

$$U = V_1 V_2 \ldots V_k L$$

where $V_1, V_2, \ldots, V_k \in \text{Gen}$, and where $L \in \text{Loc}$. The smallest integer k for which the above holds true represents the optimal and/or minimum cost of U.

In various aspects, the compiling component 1502 can determine, identify, and/or generate an optimal version of U as follows. First, the compiling component 1502 can compute the cost of U (e.g., cost(U)) by counting the number of CNOT gates currently in U. If cost(U)>0, then the compiling component 1502 can determine, identify, and/or find a $V \in \text{Gen}$ such that $$\text{cost}(V^\dagger U) = \text{cost}(U) - 1$$

where † represents the adjoint (e.g., transposed complex conjugate) symbol. In various aspects, the compiling component 1502 can find V and/or can compute the above costs by searching, querying, and/or otherwise leveraging via any suitable quantum computation technique the library of n-qubit canonical representatives 604. In various aspects, V can now be the first gate in a minimum-cost circuit that implements U. Next, U in the above formula can be replaced by $V^\dagger U$, and the compiling component 1502 can repeat the search, query, and/or computation over the library of n-qubit canonical representatives 604 (e.g., the compiling component 1502 can find a $V_1 \in \text{Gen}$ such that $\text{cost}(V_1^\dagger U) = \text{cost}(U) - 1$, can find a $V_2 \in \text{Gen}$ such that $\text{cost}(V_2^\dagger V_1^\dagger U) = \text{cost}(V_1^\dagger U) - 1$, and so on). This can be iterated/repeated until all $V_1, V_2, \ldots, V_k \in \text{Gen}$ are determined such that $\text{cost}(V_k^\dagger V_{k-1}^\dagger \ldots V_2^\dagger V_1^\dagger U) = 0$. At such point, multiplying out the expression $V_k^\dagger V_{k-1}^\dagger \ldots V_2^\dagger V_1^\dagger U$ yields only single-qubit Clifford circuits. Such single-qubit Clifford circuits can be left-multiplied by $V_1 V_2 \ldots V_k$, thereby yielding the optimal form of U. In this way, the compiling component 1502 can leverage the library of n-qubit canonical representatives 604 to optimize given/inputted Clifford circuits.

Figure 16:
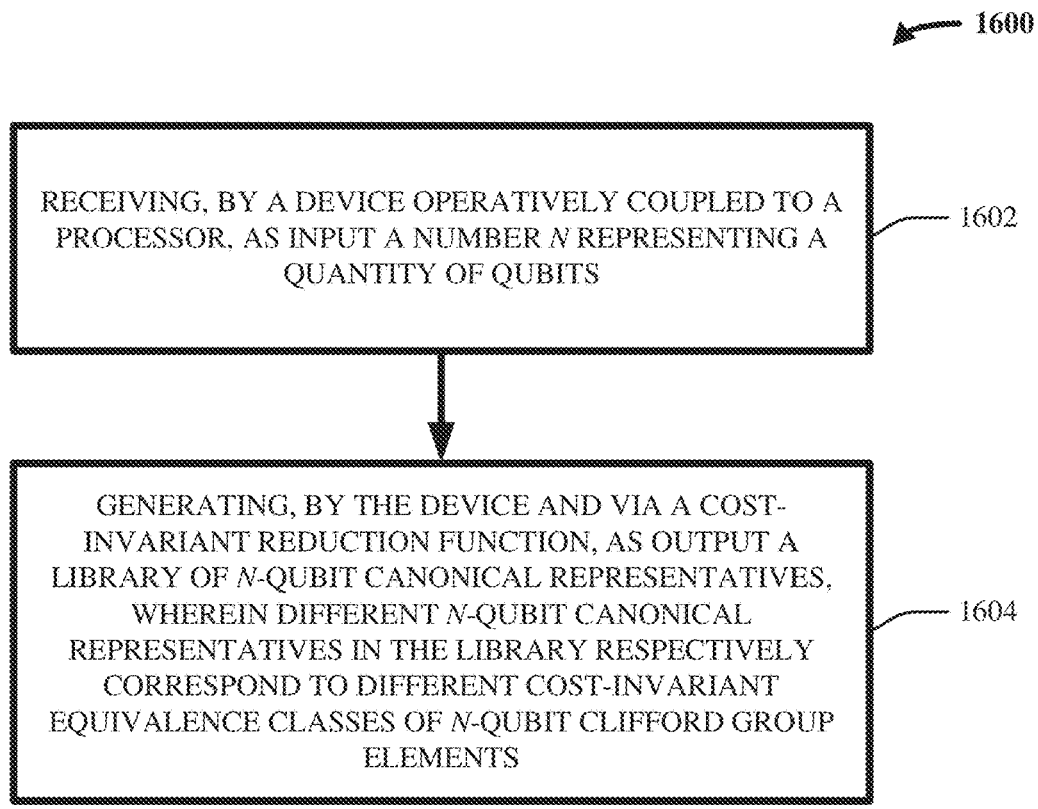
FIG. 16 illustrates a flow diagram of an example, non-limiting computer-implemented method that facilitates efficient synthesis of optimal multi-qubit Clifford circuits in accordance with one or more embodiments described herein.

FIG. 16 illustrates a flow diagram of an example, non-limiting computer-implemented method 1600 that can facilitate efficient synthesis of optimal multi-qubit Clifford circuits in accordance with one or more embodiments described herein.

In various embodiments, act 1602 can include receiving, by a device operatively coupled to a processor (e.g., 102), as input a number n representing a quantity of qubits (e.g., 104).

In various instances, act 1604 can include generating, by the device (e.g., 116) and via a cost-invariant reduction function (e.g., 604), as output a library of n-qubit canonical representatives (e.g., 604), wherein different n-qubit canonical representatives in the library respectively correspond to different cost-invariant equivalence classes of n-qubit Clifford group elements.

Figure 17:
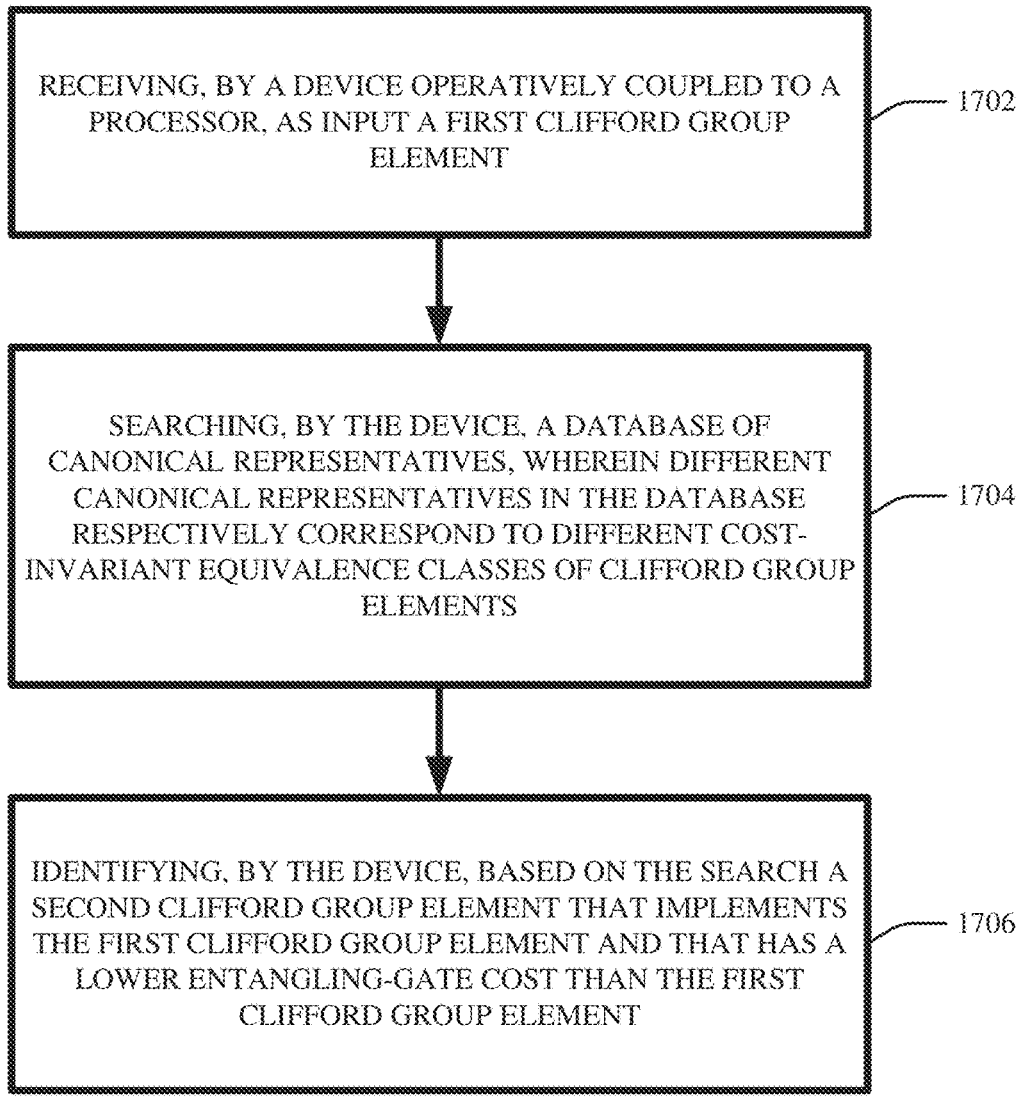
FIG. 17 illustrates a flow diagram of an example, non-limiting computer-implemented method that facilitates efficient synthesis of optimal multi-qubit Clifford circuits in accordance with one or more embodiments described herein.

FIG. 17 illustrates a flow diagram of an example, non-limiting computer-implemented method 1700 that can facilitate efficient synthesis of optimal multi-qubit Clifford circuits in accordance with one or more embodiments described herein.

In various embodiments, act 1702 can include receiving, by a device operatively coupled to a processor (e.g., 1502), as input a first Clifford group element (e.g., 1504).

In various instances, act 1704 can include searching, by the device (e.g., 1502), a database of canonical representatives (e.g., 604), wherein different canonical representatives in the database respectively correspond to different cost-invariant equivalence classes of Clifford group elements.

In various aspects, act 1706 can include identifying, by the device (e.g., 1502), based on the search a second Clifford group element (e.g., 1506) that implements the first Clifford group element and that has a lower entangling-gate cost than the first Clifford group element.

Note that the herein description utilizes various mathematical variables to aid in comprehension/explanation. However, some variables have been used multiple times but differently in different contexts (e.g., the variable U is used to represent various different Clifford circuits, operators, and/or group elements in various non-limiting examples throughout this disclosure; the variable j is used to represent various for-loop indices in certain portions of the disclosure and to represent qubit indices in other portions of the disclosure; the variable W is used in FIG. 7 to represent a qubit permutation and is used in FIG. 8 to represent a resulting canonical representative; and so on). This is done for notational convenience. Those having ordinary skill in the art will thus appreciate that the variables used herein are to be read in context (e.g., a single variable can have two or more different/unrelated meanings when used in two or more different portions of this description).

Note further that, in some cases, a "Clifford circuit" and a "Clifford operator" can be considered as having different data formats. For example, a "Clifford circuit" can be in the form of a string of quantum gates (e.g., 2n×2n matrices), and a "Clifford operator" can be in the form of a tableaux matrix (e.g., a 2n×2n tableaux). But for ease of explanation, much of the above discussion uses "Clifford circuits" interchangeably with "Clifford operators." Those of ordinary skill will understand this disclosure notwithstanding any such minor deviations from strict/rigorous mathematical terminology. In some cases, a "Clifford operator" can be considered the same as a "Clifford group element."

Overall, various embodiments of the invention constitute an improved Clifford synthesizer and/or compiler. As explained above, conventional Clifford synthesizers/compilers simply cannot electronically generate complete and/or representative libraries of optimal n-qubit Clifford circuits for n>4 due to intractability. Various embodiments of the invention, however, implement cost-invariant equivalence classes to overcome such intractability. As described herein, a library of n-qubit canonical representatives, each belonging to a different cost-invariant equivalence class, can be electronically generated/synthesized much more quickly and much more space-efficiently than a library of all optimal n-qubit Clifford circuits, which can ameliorate the intractability problem at least for n=5 and n=6. Indeed, various embodiments of the invention can function for any suitable value of n (e.g., any suitable positive integer), and can function especially well for n=1, 2, 3, 4, 5, and/or 6. Overall, various embodiments of the invention certainly constitute a concrete and tangible technical improvement in the field of quantum computation.

Figure 18:
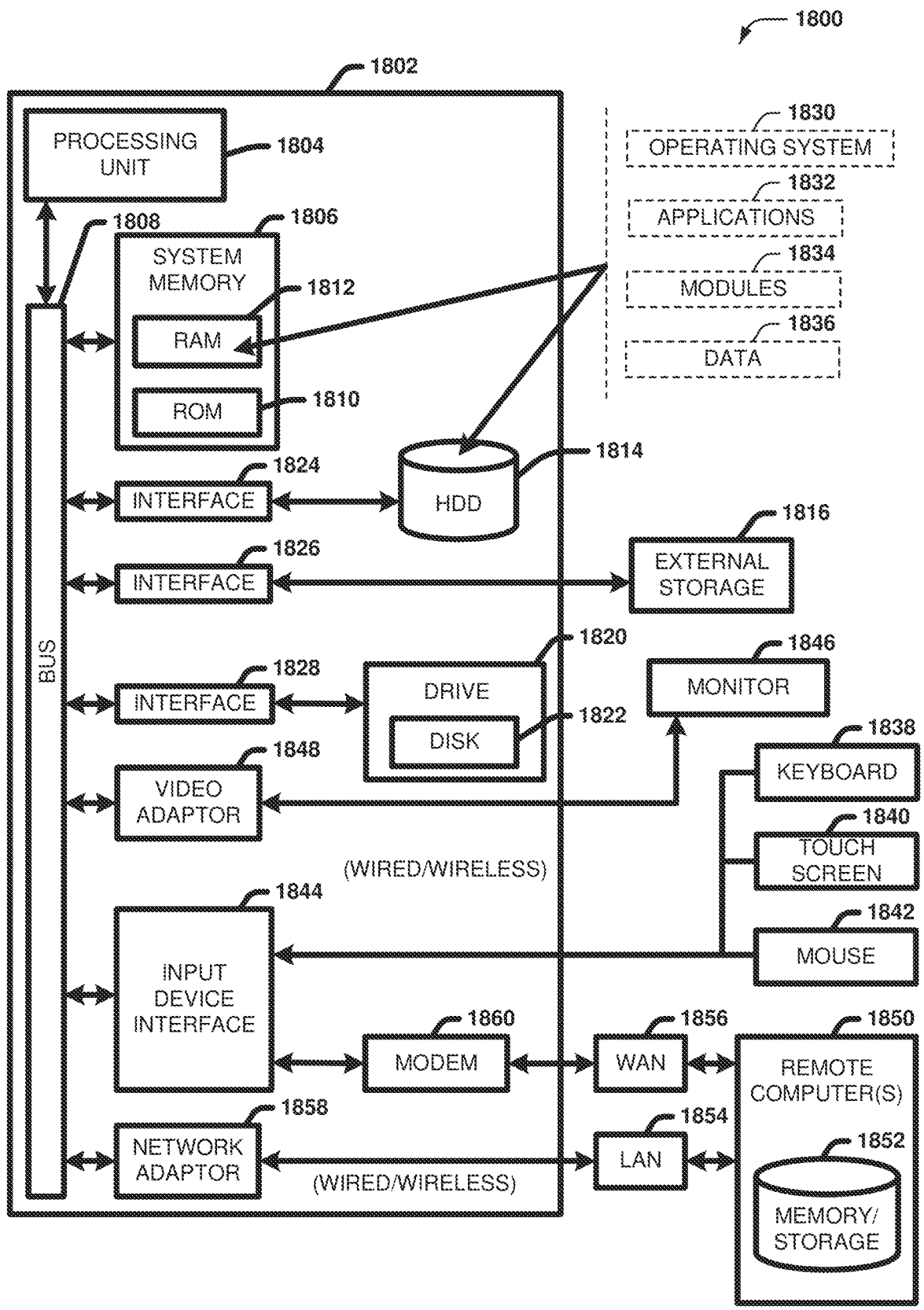
FIG. 18 illustrates a block diagram of an example, non-limiting operating environment in which one or more embodiments described herein can be facilitated.

In order to provide additional context for various embodiments described herein, FIG. 18 and the following discussion are intended to provide a general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 19:
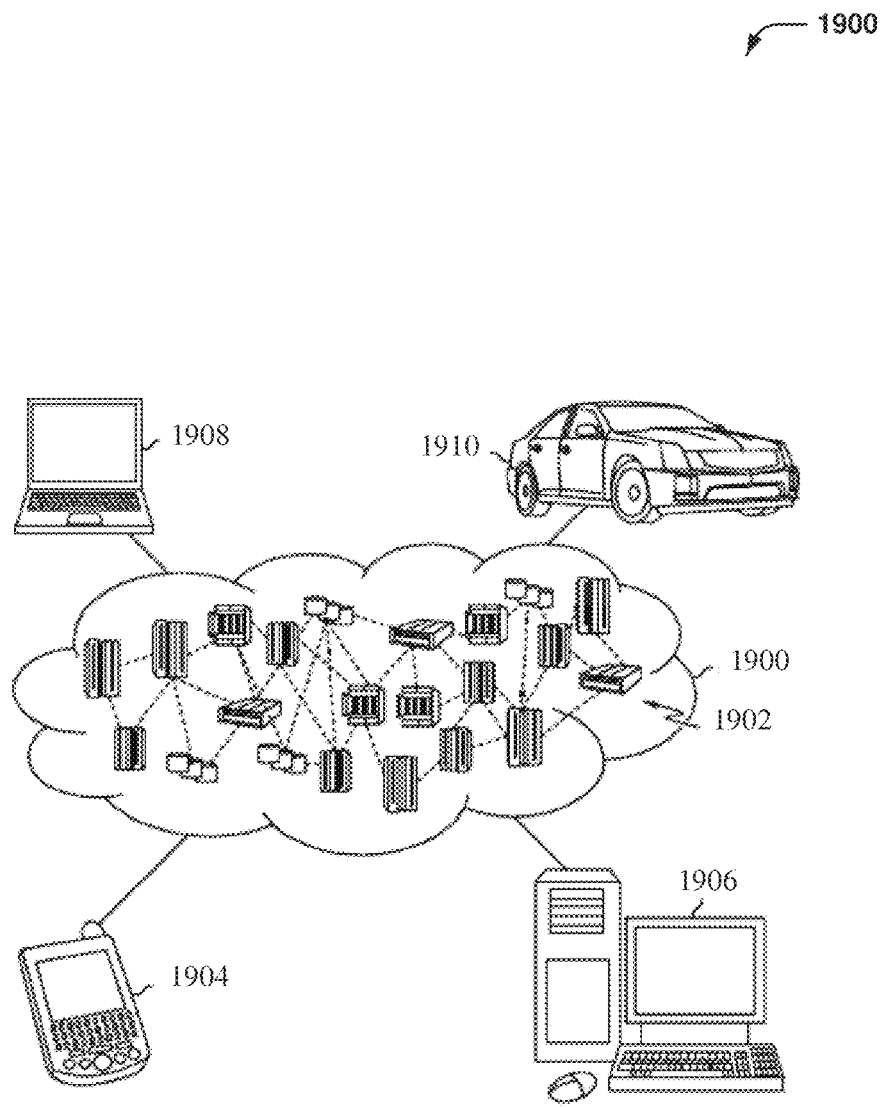
FIG. 19 illustrates an example, non-limiting cloud computing environment in accordance with one or more embodiments described herein.

Referring now to FIG. 19, illustrative cloud computing environment 1900 is depicted. As shown, cloud computing environment 1900 includes one or more cloud computing nodes 1902 with which local computing devices used by cloud consumers, such as, for example, personal digital assistant (PDA) or cellular telephone 1904, desktop computer 1906, laptop computer 1908, and/or automobile computer system 1910 may communicate. Nodes 1902 may communicate with one another. They may be grouped (not shown) physically or virtually, in one or more networks, such as Private, Community, Public, or Hybrid clouds as described hereinabove, or a combination thereof. This allows cloud computing environment 1900 to offer infrastructure, platforms and/or software as services for which a cloud consumer does not need to maintain resources on a local computing device. It is understood that the types of computing devices 1904-1910 shown in FIG. 19 are intended to be illustrative only and that computing nodes 1902 and cloud computing environment 1900 can communicate with any type of computerized device over any type of network and/or network addressable connection (e.g., using a web browser).

Figure 20:
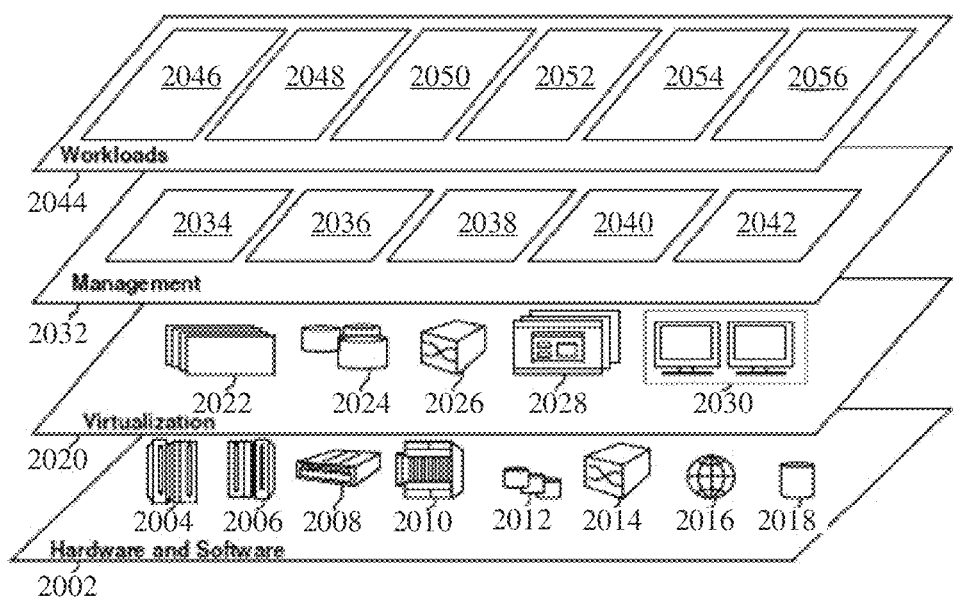
FIG. 20 illustrates example, non-limiting abstraction model layers in accordance with one or more embodiments described herein.

Referring now to FIG. 20, a set of functional abstraction layers provided by cloud computing environment 1900 (FIG. 19) is shown. Repetitive description of like elements employed in other embodiments described herein is omitted for sake of brevity. It should be understood in advance that the components, layers, and functions shown in FIG. 20 are intended to be illustrative only and embodiments of the invention are not limited thereto. As depicted, the following layers and corresponding functions are provided.

Hardware and software layer 2002 includes hardware and software components. Examples of hardware components include: mainframes 2004; RISC (Reduced Instruction Set Computer) architecture based servers 2006; servers 2008; blade servers 2010; storage devices 2012; and networks and networking components 2014. In some embodiments, software components include network application server software 2016 and database software 2018.

Virtualization layer 2020 provides an abstraction layer from which the following examples of virtual entities may be provided: virtual servers 2022; virtual storage 2024; virtual networks 2026, including virtual private networks; virtual applications and operating systems 2028; and virtual clients 2030.

In one example, management layer 2032 may provide the functions described below. Resource provisioning 2034 provides dynamic procurement of computing resources and other resources that are utilized to perform tasks within the cloud computing environment. Metering and Pricing 2036 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2038 provides access to the cloud computing environment for consumers and system administrators. Service level management 2040 provides cloud computing resource allocation and management such that required service levels are met. Service Level Agreement (SLA) planning and fulfillment 2042 provide pre-arrangement for, and procurement of, cloud computing resources for which a future requirement is anticipated in accordance with an SLA.

Workloads layer 2044 provides examples of functionality for which the cloud computing environment may be utilized. Examples of workloads and functions which may be provided from this layer include: mapping and navigation 2046; software development and lifecycle management 2048; virtual classroom education delivery 2050; data analytics processing 2052; transaction processing 2054; and differentially private federated learning processing 2056. Various embodiments of the present invention can utilize the cloud computing environment described with reference to FIGS. 19 and 20 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a memory, the computer-executable components comprising:
a library component that, for a number n representing a quantity of qubits, generates, via a cost-invariant reduction function, a library of different n-qubit canonical representatives that respectively correspond to different cost-invariant equivalence classes of n-qubit Clifford group elements,
wherein the cost-invariant equivalence classes are classes that are equivalent in terms of entangling-gate cost, and wherein $n \leq 6$;
a compiling component that:
receives as input a suboptimal n-qubit Clifford operator;
computes the cost of the suboptimal n-qubit Clifford operator; and
search the library of n-qubit canonical representatives and determine or identify an optimal n-qubit Clifford operator that implements the suboptimal n-qubit Clifford operator and is lower cost than the cost of the suboptimal n-qubit Clifford operator.

2. The system of claim 1, wherein a first n-qubit canonical representative in the library of different n-qubit canonical representatives respectively corresponds to a first equivalence class of the different cost-invariant equivalence classes, and wherein the first n-qubit canonical representative is a lexicographically minimum element in the first equivalence class.

3. The system of claim 2, wherein the library component computes the first n-qubit canonical representative via the cost-invariant reduction function and based on an n-qubit Clifford group element U in the first equivalence class, wherein the cost-invariant reduction function is given by:

$$\text{Reduce}(U) = \arg\min_{W \in S_n} \min_{L, R \in Loc} LWUW^{-1}R$$

where Reduce (U) represents the first n-qubit canonical representative, where $S_n$ represents a set of n-qubit permutations, where W represents an n-qubit permutation from $S_n$, where Loc represents a local subset of Clifford group elements, and where L and R represent local Clifford group elements from Loc.

4. The system of claim 3, further comprising:
a pruning component that prunes $S_n$ and Loc according to a subgroup-adapted order that prioritizes qubit permutations over local Clifford group elements and that prioritizes left multiplications by local Clifford group elements over right multiplications by local Clifford group elements.

5. The system of claim 2, wherein the first n-qubit canonical representative is specified up to a phase by a set of bit strings that indicate how the first n-qubit canonical representative maps various Pauli operators to other Pauli operators, and wherein the first n-qubit canonical representative is stored in the library according to a thin matrix binary format which omits a portion of the set of bit strings.

6. A computer-implemented method, comprising:
receiving, by a device operatively coupled to a processor, as input a number n representing a quantity of qubits; and
generating, by the device and via a cost-invariant reduction function, as output a library of different n-qubit canonical representatives that respectively correspond to different cost-invariant equivalence classes of n-qubit Clifford group elements, wherein the cost-invariant equivalence classes are classes that are equivalent in terms of entangling-gate cost;
receiving, by the device, as input a suboptimal n-qubit Clifford operator;
computing, by the device, the cost of the suboptimal n-qubit Clifford operator; and
searching, by the device, the library of n-qubit canonical representatives and determining or identifying an optimal n-qubit Clifford operator that implements the suboptimal n-qubit Clifford operator and is lower cost than the cost of the suboptimal n-qubit Clifford operator.

7. The computer-implemented method of claim 6, wherein a first n-qubit canonical representative in the library of different n-qubit canonical representatives respectively corresponds to a first equivalence class of the different cost-invariant equivalence classes, and wherein the first n-qubit canonical representative is a lexicographically minimum element in the first equivalence class.

8. The computer-implemented method of claim 7, further comprising:
computing, by the device, the first n-qubit canonical representative via the cost-invariant reduction function and based on an n-qubit Clifford group element U in the first equivalence class, wherein the cost-invariant reduction function is given by:

$$\text{Reduce}(U) = \arg\min_{W \in S_n} \min_{L, R \in Loc} LWUW^{-1}R$$

where Reduce (U) represents the first n-qubit canonical representative, where $S_n$ represents a set of n-qubit permutations, where W represents an n-qubit permutation from $S_n$, where Loc represents a local subset of Clifford group elements, and where L and R represent local Clifford group elements from Loc.

9. The computer-implemented method of claim 8, further comprising:
pruning, by the device, $S_n$ and Loc according to a subgroup-adapted order that prioritizes qubit permutations over local Clifford group elements and that prioritizes left multiplications by local Clifford group elements over right multiplications by local Clifford group elements.

10. The computer-implemented method of claim 7, wherein the first n-qubit canonical representative is specified up to a phase by a set of bit strings that indicate how the first n-qubit canonical representative maps various Pauli operators to other Pauli operators, and wherein the first n-qubit canonical representative is stored in the library according to a thin matrix binary format which omits a portion of the set of bit strings.

11. A computer program product for facilitating synthesis of Clifford circuits, the computer program product comprising a computer readable memory having program instructions embodied therewith, the program instructions executable by a processor to cause the processor to:

receive as input a number n representing a quantity of qubits; and apply a cost-invariant reduction function and generate, as a result of the application, a library of different n-qubit canonical representatives that respectively correspond to different cost-invariant equivalence classes of n-qubit Clifford group elements, wherein the cost-invariant equivalence classes are classes that are equivalent in terms of entangling-gate cost;

receive as input a suboptimal n-qubit Clifford operator;

compute the cost of the suboptimal n-qubit Clifford operator; and search the library of n-qubit canonical representatives and determining or identifying an optimal n-qubit Clifford operator that implements the suboptimal n-qubit Clifford operator and is lower cost than the cost of the suboptimal n-qubit Clifford operator.

12. The computer program product of claim 11, wherein a first n-qubit canonical representative in the library of different n-qubit canonical representatives respectively corresponds to a first equivalence class of the different cost-invariant equivalence classes, and wherein the first n-qubit canonical representative is a lexicographically minimum element in the first equivalence class.

13. The computer program product of claim 12, wherein the program instructions are further executable to cause the processor to:

compute the first n-qubit canonical representative via the cost-invariant reduction function and based on an n-qubit Clifford group element U in the first equivalence class, wherein the cost-invariant reduction function is given by:

$$\text{Reduce}(U) = \arg\min_{W \in S_n} \min_{L, R \in Loc} LWUW^{-1}R$$

where Reduce (U) represents the first n-qubit canonical representative, where $S_n$ represents a set of n-qubit permutations, where W represents an n-qubit permutation from $S_n$, where Loc represents a local subset of Clifford group elements, and where L and R represent local Clifford group elements from Loc.

14. The computer program product of claim 13, wherein the program instructions are further executable to cause the processor to:

prune $S_n$ and Loc according to a subgroup-adapted order that prioritizes qubit permutations over local Clifford group elements and that prioritizes left multiplications by local Clifford group elements over right multiplications by local Clifford group elements.

15. The computer program product of claim 12, wherein the first n-qubit canonical representative is specified up to a phase by a set of bit strings that indicate how the first n-qubit canonical representative maps various Pauli operators to other Pauli operators, and wherein the first n-qubit canonical representative is stored in the library according to a thin matrix binary format which omits a portion of the set of bit strings.

* * * * *